United States Patent
Zhang et al.

(10) Patent No.: US 12,267,869 B2
(45) Date of Patent: Apr. 1, 2025

(54) SYSTEMS AND METHODS FOR TWO-STEP RANDOM ACCESS PROCEDURE

(71) Applicant: Huawei Technologies Co., Ltd., Shenzhen (CN)

(72) Inventors: Liqing Zhang, Ottawa (CA); Jiayin Zhang, Shanghai (CN); Mohamed Adel Salem, Kanata (CA)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 466 days.

(21) Appl. No.: 17/238,655

(22) Filed: Apr. 23, 2021

(65) Prior Publication Data
US 2021/0243814 A1   Aug. 5, 2021

Related U.S. Application Data

(63) Continuation of application No. PCT/CN2019/112226, filed on Oct. 21, 2019.

(60) Provisional application No. 62/751,073, filed on Oct. 26, 2018.

(51) Int. Cl.
*H04W 74/0833* (2024.01)

(52) U.S. Cl.
CPC ............... *H04W 74/0833* (2013.01)

(58) Field of Classification Search
CPC ............ H04W 74/0833; H04W 72/02; H04W 72/1268; H04W 74/004; H04W 74/0836; H04W 74/0838
See application file for complete search history.

(56) References Cited

U.S. PATENT DOCUMENTS

| | | | |
|---|---|---|---|
| 2018/0205516 A1 | 7/2018 | Jung et al. | |
| 2019/0190674 A1* | 6/2019 | Aiba | H04L 5/001 |
| 2019/0357174 A1 | 11/2019 | Zhao et al. | |
| 2019/0357265 A1* | 11/2019 | Ren | H04W 72/0446 |
| 2019/0357268 A1 | 11/2019 | Zhao et al. | |
| 2020/0100297 A1* | 3/2020 | Agiwal | H04B 17/327 |
| 2020/0112994 A1* | 4/2020 | Zhang | H04L 27/2605 |
| 2023/0397257 A1* | 12/2023 | Jeon | H04W 72/23 |

FOREIGN PATENT DOCUMENTS

| | | |
|---|---|---|
| CN | 107872899 A | 4/2018 |
| CN | 108282301 A | 7/2018 |
| CN | 108282874 A | 7/2018 |
| CN | 108282895 A | 7/2018 |

(Continued)

OTHER PUBLICATIONS

Discussion on simplified RACH procedure, 3GPP TSG RAN WG1 Meeting #87, R1-1612468, Reno, Nevada, USA, Nov. 14-18, 2016 (Year: 2016).*

(Continued)

*Primary Examiner* — Phirin Sam
*Assistant Examiner* — David Zhijun Sun
(74) *Attorney, Agent, or Firm* — Slater Matsil, LLP

(57) ABSTRACT

Systems and methods for two-step random access procedure are described. According to embodiments, a user equipment (UE) transmits a random access preamble on a random access channel. The UE also transmits data on an uplink data channel using a particular uplink data channel resource. The particular uplink data channel resource is selected by the UE based on the random access preamble.

28 Claims, 15 Drawing Sheets

(56) References Cited

FOREIGN PATENT DOCUMENTS

| KR | 20110003362 A | 1/2011 |
| KR | 20110057135 A | 5/2011 |
| KR | 20180034526 A | 4/2018 |
| WO | 2018175809 A1 | 9/2018 |

OTHER PUBLICATIONS

NR two-step random access procedure, 3GPP TSG-RAN WG1 NR adhoc, R1-1700300,Spokane, USA, Jan. 16-20, 2017 (Year: 2017).*
2-Step RACH Procedure, 3GPP TSG-RAN WG2 Meeting # 103bis, R2-1814008, Chengdu, China, Oct. 8-12, 2018 (Year: 2018).*
Ericsson, "NR two-step random access procedure", 3GPP TSG-RAN WG1 NR adhoc, R1-1700300, Jan. 16-20, 2017, Spokane, USA, 4 pages.
Samsung, "Discussion on simplified RACH procedure", 3GPP TSG RAN WG1 Meeting #87, R1-1612468, Nov. 14-18, 2016, Reno, Nevada, USA, 5 pages.
Interdigital, "2-Step RACH Procedure", 3GPP TSG-RAN WG2 Meeting # 103bis, R2-1814008, Oct. 8-12, 2018, 5 Pages, Chengdu, China.

* cited by examiner

Example 1:

| Preamble Index | PUSCH Resource Grant Index | Parameters of granted PUSCH Resource |
|---|---|---|
| Preamble 1 | Resource 1 | Time-freq 'A1', MCS 'B1', DMRS 'C1', etc. |
| Preamble 2 | Resource 1 | Time-freq 'A1', MCS 'B1', DMRS 'C1', etc. |
| Preamble 3 | Resource 2 | Time-freq 'A2', MCS 'B2', DMRS 'C2', etc. |

Example 2:

| PRACH Index | Preamble Index | PUSCH Resource Grant Index | Parameters of granted PUSCH Resource |
|---|---|---|---|
| 1 | Preamble 1 | Resource 1 | Time-freq 'A1', MCS 'B1', DMRS 'C1', etc. |
| 1 | Preamble 2 | Resource 2 | Time-freq 'A2', MCS 'B2', DMRS 'C2', etc. |
| 1 | Preamble 3 | Resource 3 | Time-freq 'A3', MCS 'B3', DMRS 'C3', etc. |
| 2 | Preamble 1 | Resource 1 | Time-freq 'A1', MCS 'B1', DMRS 'C1', etc. |
| 2 | Preamble 2 | Resource 2 | Time-freq 'A2', MCS 'B2', DMRS 'C2', etc. |
| 2 | Preamble 3 | Resource 3 | Time-freq 'A3', MCS 'B3', DMRS 'C3', etc. |

FIG. 11

Example 1:

| Preamble Index | PUSCH Resource Grant Index | Parameters of granted PUSCH Resource |
|---|---|---|
| Preamble 1 | Resource 1 | Time-freq 'A1', MCS 'B1', DMRS 'C1', etc. or Time-freq 'A2', MCS 'B1', DMRS 'C1', etc. |
| Preamble 2 | Resource 2 | Time-freq 'A3', MCS 'B3', DMRS 'C3', etc. |
| Preamble 3 | Resource 3 | Time-freq 'A4', MCS 'B4', DMRS 'C4', etc. |

Example 2:

| PRACH Index | Preamble Index | PUSCH Resource Grant Index | Parameters of granted PUSCH Resource |
|---|---|---|---|
| 1 | Preamble 1 | Resource 1 | Time-freq 'A1', MCS 'B1', DMRS 'C1', etc. or Time-freq 'A2', MCS 'B2', DMRS 'C2', etc. |
| 1 | Preamble 2 | Resource 2 | Time-freq 'A3', MCS 'B3', DMRS 'C3', etc. or Time-freq 'A4', MCS 'B4', DMRS 'C4', etc. |
| 2 | Preamble 1 | Resource 3 | Time-freq 'A5', MCS 'B5', DMRS 'C5', etc. |
| 2 | Preamble 2 | Resource 4 | Time-freq 'A6', MCS 'B6', DMRS 'C6', etc. |

FIG. 12

SYSTEMS AND METHODS FOR TWO-STEP RANDOM ACCESS PROCEDURE

CROSS-REFERENCE TO RELATED APPLICATIONS

The present application is a continuation of International Application No. PCT/CN2019/112226, entitled "Systems and Methods for Two-Step Random Access Procedure," filed on Oct. 21, 2019, which claims priority to U.S. Provisional Patent Application Ser. No. 62/751,073, entitled "Systems and Methods for Two-Step Random Access Procedure," filed on Oct. 26, 2018, both of which applications are hereby incorporated herein by reference as if reproduced in their entireties.

TECHNICAL FIELD

The present application relates to wireless communication, and more particularly to a random access procedure.

BACKGROUND

In some wireless communication systems, user equipments (UEs) wirelessly communicate with a base station to send data to and/or receive data from a network. A wireless communication from a UE to the base station is referred to as an uplink communication. A wireless communication from the base station to a UE is referred to as a downlink communication.

Resources are required to perform uplink and downlink communications. For example, a UE may wirelessly transmit data to a base station in an uplink transmission at a particular frequency and over a particular duration of time. The frequency and time duration used are examples of resources, and are sometimes called "time-frequency" resources. Other examples of resources or parameters for data transmission include modulation and coding scheme (MCS) used, reference signal such as demodulation reference signal (DMRS) for channel estimation, and transmit power ramping values used.

The wireless communication occurs over channels. A channel may be an uplink channel or a downlink channel. For example, a physical broadcast channel (PBCH) is a downlink channel used to transmit system information to UEs wanting to access the network. As another example, a physical uplink shared channel (PUSCH) is an uplink channel used to send data from a UE to a base station. As another example, a physical downlink shared channel (PDSCH) is a downlink channel used to send data from a base station to a UE.

Sometimes during wireless communication a random access procedure needs to be performed. Example situations in which a random access procedure may be performed include: initial network access and connection establishment for a UE, e.g. registering with the network and acquiring uplink synchronization; re-synchronization when the UE and base station are out of synchronization, which may occur when the UE is in a connected state or in an inactive or idle state; connection re-establishment for connection failure; uplink or downlink data arrival when the uplink is in a non-synchronous condition; and/or handover procedure when timing synchronization is needed. When performing a random access procedure, a random access channel is used, e.g. a physical random access channel (PRACH).

The random access procedure often involves several steps. For example, a four-step random access procedure involves the following message exchanges: (1) the UE transmits a preamble on configured random access channel resources; (2) in response to receipt of the preamble, the base station transmits a random access response (RAR) message; (3) in response to receipt of the RAR message, the UE transmits an uplink transmission in an uplink data channel using an uplink grant present in the RAR; and (4) in response to receipt of the uplink transmission from the UE in the uplink data channel, the base station transmits a reply, which may include a contention resolution message.

The number of exchanges involved in the four-step random access procedure may introduce an unacceptable level of latency and/or an unacceptable level of signaling overhead. The level of latency and/or signaling overhead may be further increased when the four-step random access procedure is performed in unlicensed spectrum, because a listen before talk (LBT) protocol may need to be used, and one or more steps in the random access procedure may fail due to unavailability of the channel.

It is desired to improve the random access procedure to try to address latency and/or signaling overhead concerns. It may also be desired to try to achieve data transmission without a dynamic scheduling grant from the base station, referred to as a grant-free (GF) transmission, e.g. in asynchronous scenarios.

SUMMARY

A two-step (or 2-step) random access procedure is disclosed herein, which may help reduce latency and/or signaling overhead compared to a four-step (or 4-step) random access procedure. Moreover, some problems relating to a two-step random access procedure have been recognized and are addressed in some embodiments, for example: how to indicate resources for the uplink grant; how to switch from a two-step random access procedure to a four-step random access procedure when necessary; and/or how to accommodate UEs that do not have the capability to perform a two-step random access procedure.

In some aspects, the first step transmission in a two-step random access procedure, i.e. the transmission from the UE that includes the preamble and a Msg 3, can also serve as a grant-free (GF) data transmission, where the Msg 3 includes the GF traffic (e.g., UE uplink data or/and control info), where GF means no dynamic transmission scheduling from any base station for the data transmission. In some aspects, the first step transmission includes a GF data transmission in asynchronous channel conditions, for connected states, inactive states and/or idle states, where the preamble transmission can be used by the receiver to measure user timing and/or to perform other functions, such as user identification. Moreover, the GF data transmission can be applied among user equipments (e.g. a GF data transmission sent from one UE to another UE), or between user equipments and the base station(s) (e.g. a GF data transmission sent from a UE to a base station).

By using the systems and methods of some aspects, at least one of the following benefits may be realized: a random access preamble may be mapped to a grant/allocation of resources in an uplink data channel, which may facilitate indicating uplink data channel resources to the UE; a four-step random access procedure may be automatically performed upon one or multiple unsuccessful attempts at a two-step random access procedure; UEs capable of performing a two-step random access procedure and UEs only capable of performing a four-step random access procedure (e.g. legacy UEs) may both be accommodated. Furthermore, in some aspects a two-step random access procedure as disclosed may include a GF data transmission (i.e., a direct data transmission without dynamic transmission scheduling from any base station) and possibly a receiver feedback in response to the GF data transmission, such as a hybrid automatic repeat request (hybrid ARQ or HARQ). In some aspects, the GF data transmission and receiver feedback may occur in asynchronous channel conditions under radio resource control (RRC) connected states, inactive states, and/or idle states.

In one aspect, there is provided a method performed by a UE. The method includes transmitting a random access preamble on a random access channel. The method further includes transmitting data on an uplink data channel using a particular uplink data channel resource. The particular uplink data channel resource is selected by the UE based on the random access preamble.

Optionally, in any of the preceding aspects, there is a one-to-one mapping between the particular uplink data channel resource and the random access preamble.

Optionally, in any of the preceding aspects, the particular uplink data channel resource is associated with both the random access preamble and at least one other random access preamble.

Optionally, in any of the preceding aspects, at least one other uplink data channel resource different from the particular uplink data channel resource is also associated with the random access preamble.

Optionally, in any of the preceding aspects, the random access preamble is selected from a set of random access preambles, and wherein each random access preamble in the set of random access preambles is associated with a respective uplink data channel resource.

Optionally, in any of the preceding aspects, each random access preamble in the set of random access preambles is associated with a different uplink data channel resource.

Optionally, in any of the preceding aspects, more than one random access preamble in the set of random access preambles is associated with a same uplink data channel resource.

Optionally, in any of the preceding aspects, the method further comprises receiving, from a base station: an indication of the set of random access preambles; and an indication of an association between: (i) each random access preamble in the set of random access preambles and (ii) the respective uplink data channel resource.

Optionally, in any of the preceding aspects, the method further comprises receiving, from the base station, at least one transmission parameter for the respective uplink data channel resource; and wherein the at least one transmission parameter includes at least one of the following: time-frequency resource allocation in the uplink data channel; resource index; frequency hopping flag; modulation and coding scheme (MCS) to be used for an uplink data transmission; transmission power control (TPC) for the uplink data transmission; channel state information (CSI); demodulation reference signal (DMRS); transmit power ramping value; periodicity; a hopping parameter; bandwidth part; numerology; repetition pattern.

Optionally, in any of the preceding aspects, the random access preamble is selected by the UE from a particular set of random access preambles, and wherein the particular set of random access preambles are used for two-step random access procedures and not used for four-step random access procedures.

Optionally, in any of the preceding aspects, both the particular set of random access preambles used for the two-step random access procedures and other random access preambles used for the four-step random access procedures use a same random access channel.

Optionally, in any of the preceding aspects, the random access preamble is transmitted on a particular time-frequency resource on the random access channel, and wherein the particular time-frequency resource is used for two-step random access procedures and not used for four-step random access procedures.

Optionally, in any of the preceding aspects, the random access preamble is selected by the UE from a particular set of random access preambles, and wherein the particular set of random access preambles is used for both two-step random access procedures and four-step random access procedures.

In another aspect, a user equipment comprises: a transmitter; and a random access module; the random access module to cause the transmitter to: transmit a random access preamble on a random access channel, and transmit data on an uplink data channel using a particular uplink data channel resource. The random access module is to select the particular uplink data channel resource based on the random access preamble.

Optionally, in any of the preceding aspects, there is a one-to-one mapping between the particular uplink data channel resource and the random access preamble.

Optionally, in any of the preceding aspects, the particular uplink data channel resource is associated with both the random access preamble and at least one other random access preamble.

Optionally, in any of the preceding aspects, at least one other uplink data channel resource different from the particular uplink data channel resource is also associated with the random access preamble.

Optionally, in any of the preceding aspects, the random access module is to select the random access preamble from a set of random access preambles, and wherein each random access preamble in the set of random access preambles is associated with a respective uplink data channel resource.

Optionally, in any of the preceding aspects, each random access preamble in the set of random access preambles is associated with a different uplink data channel resource.

Optionally, in any of the preceding aspects, more than one random access preamble in the set of random access preambles is associated with a same uplink data channel resource.

Optionally, in any of the preceding aspects, the user equipment further comprises a receiver to receive, from a base station: an indication of the set of random access preambles; and an indication of an association between (i) each random access preamble in the set of random access preambles and (ii) the respective uplink data channel resource.

Optionally, in any of the preceding aspects, the receiver is to receive, from the base station, at least one transmission parameter for the respective uplink data channel resource; and wherein the at least one transmission parameter includes at least one of the following: time-frequency resource allocation in the uplink data channel; resource index; frequency hopping flag; modulation and coding scheme (MCS) to be used for an uplink data transmission; transmission power control (TPC) for the uplink data transmission; channel state information (CSI); demodulation reference signal (DMRS); transmit power ramping value; periodicity; a hopping parameter; bandwidth part; numerology; repetition pattern.

Optionally, in any of the preceding aspects, the random access module is to select the random access preamble from a particular set of random access preambles, and wherein the particular set of random access preambles are used for two-step random access procedures and not used for four-step random access procedures.

Optionally, in any of the preceding aspects, both the particular set of random access preambles used for the two-step random access procedures and other random access preambles used for the four-step random access procedures use a same random access channel.

Optionally, in any of the preceding aspects, the transmitter is to transmit the random access preamble on a particular time-frequency resource on the random access channel, and wherein the particular time-frequency resource is used for two-step random access procedures and not used for four-step random access procedures.

Optionally, in any of the preceding aspects, the random access module is to select the random access preamble from a particular set of random access preambles, and wherein the particular set of random access preambles is used for both two-step random access procedures and four-step random access procedures.

BRIEF DESCRIPTION OF THE DRAWINGS

Embodiments will be described, byway of example only, with reference to the accompanying figures wherein:

FIG. 11 illustrates two examples of a multiple-to-one mapping for uplink channel resources;

FIG. 12 illustrates two examples of a one-to-multiple mapping for uplink channel resources;

FIC. 16 is a flowchart of a method performed by a UE, according to one embodiment.

DETAILED DESCRIPTION OF ILLUSTRATIVE EMBODIMENTS

For illustrative purposes, specific example embodiments will now be explained in greater detail below in conjunction with the figures.

Example Communication Systems and Devices

Figure 1:
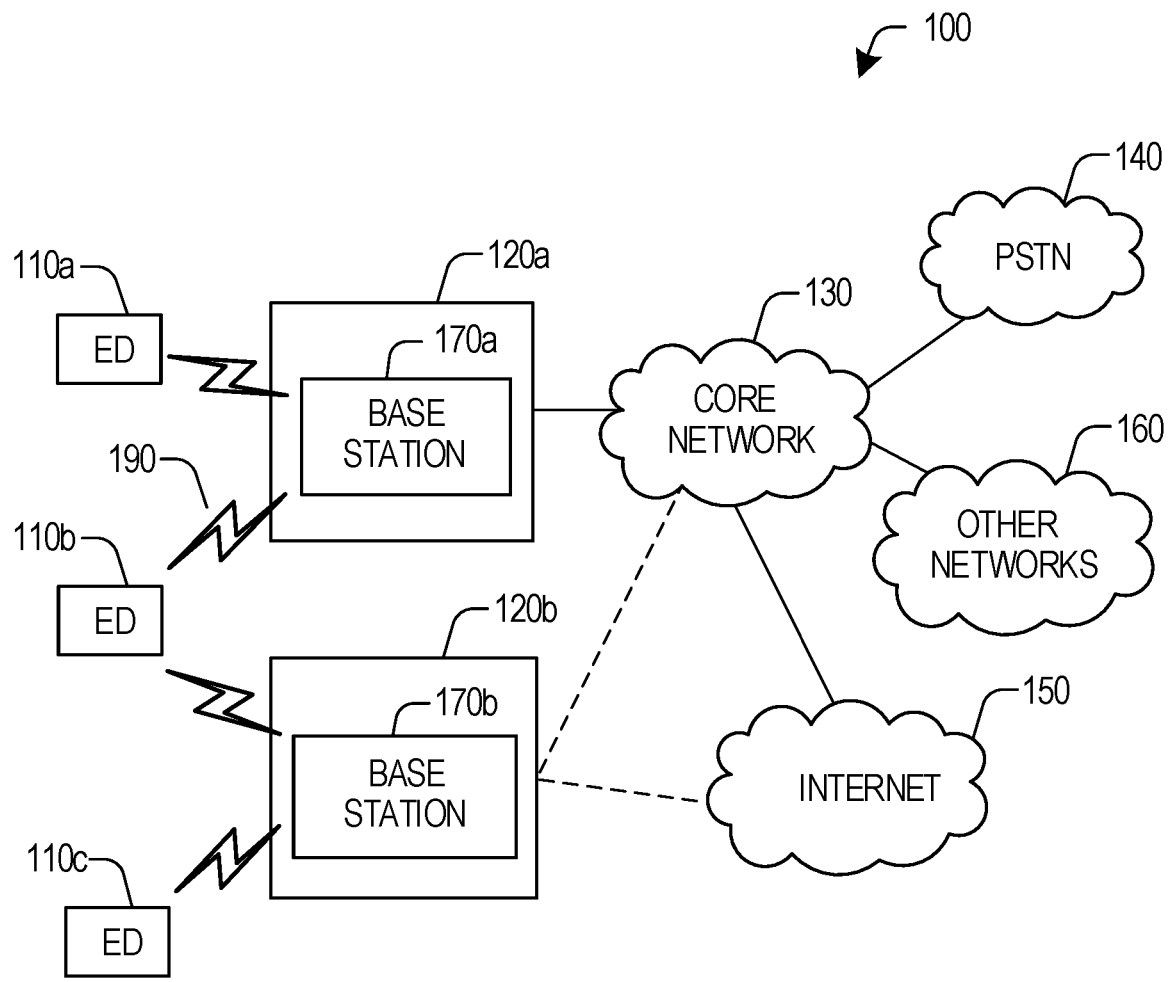
FIG. 1 is a network diagram of an example communication system.

FIG. 1 illustrates an example communication system 100. In general, the communication system 100 enables multiple wireless or wired elements to communicate data and other content. The purpose of the communication system 100 may be to provide content, such as voice, data, video, and/or text, via broadcast, narrowcast, user device to user device, etc. The communication system 100 may operate by sharing resources, such as bandwidth.

In this example, the communication system 100 includes electronic devices (ED) 110a-110c, radio access networks (RANs) 120a-120b, a core network 130, a public switched telephone network (PSTN) 140, the internet 150, and other networks 160. Although certain numbers of these components or elements are shown in FIG. 1, any reasonable number of these components or elements may be included in the communication system 100.

The EDs 110a-110c are configured to operate, communicate, or both, in the communication system 100. For example, the EDs 110a-110c are configured to transmit, receive, or both via wireless or wired communication channels. Each ED 110a-110c represents any suitable end user device for wireless operation and may include such devices (or may be referred to) as a user equipment/device (UE), wireless transmit/receive unit (WTRU), mobile station, fixed or mobile subscriber unit, cellular telephone, station (STA), machine type communication (MTC) device, personal digital assistant (PDA), smartphone, laptop, computer, tablet, wireless sensor, or consumer electronics device.

In FIG. 1, the RANs 120a-120b include base stations 170a-170b, respectively. Each base station 170a-170b is configured to wirelessly interface with one or more of the EDs 110a-110c to enable access to any other base station 170a-170b, the core network 130, the PSTN 140, the internet 150, and/or the other networks 160. For example, the base stations 170a-170b may include (or be) one or more of several well-known devices, such as a base transceiver station (BTS), a Node-B (NodeB), an evolved NodeB (eNodeB), a Home eNodeB, a gNodeB, a transmission point (TP), a site controller, an access point (AP), or a wireless router. Any ED 110a-110c may be alternatively or additionally configured to interface, access, or communicate with any other base station 170a-170b, the internet 150, the core network 130, the PSTN 140, the other networks 160, or any combination of the preceding. The communication system 100 may include RANs, such as RAN 120b, wherein the corresponding base station 170b accesses the core network 130 via the internet 150.

The EDs 110a-110c and base stations 170a-170b are examples of communication equipment that can be configured to implement some or all of the functionality and/or embodiments described herein. In the embodiment shown in FIG. 1, the base station 170a forms part of the RAN 120a, which may include other base stations, base station controller(s) (BSC), radio network controller(s) (RNC), relay nodes, elements, and/or devices. Any base station 170a, 170b may be a single element, as shown, or multiple elements, distributed in the corresponding RAN, or otherwise. Also, the base station 170b forms part of the RAN 120b, which may include other base stations, elements, and/or devices. Each base station 170a-170b transmits and/or receives wireless signals within a particular geographic region or area, sometimes referred to as a "cell" or "coverage area". A cell may be further divided into cell sectors, and a base station 170a-170b may, for example, employ multiple transceivers to provide service to multiple sectors. In some embodiments there may be established pico or femto cells where the radio access technology supports such. In some embodiments, multiple transceivers could be used for each cell, for example using multiple-input multiple-output (MIMO) technology. The number of RAN 120a-120b shown is exemplary only. Any number of RAN may be contemplated when devising the communication system 100.

The base stations 170a-170b communicate with one or more of the EDs 110a-110c over one or more air interfaces 190 using wireless communication links e.g. radio frequency (RF), microwave, infrared (IR), etc. The air interfaces 190 may utilize any suitable radio access technology. For example, the communication system 100 may implement one or more channel access methods, such as code division multiple access (CDMA), time-division multiple access (TDMA), frequency-division multiple access (FDMA), orthogonal FDMA (OFDMA), or single-carrier FDMA (SC-FDMA) in the air interfaces 190.

A base station 170a-170b may implement Universal Mobile Telecommunication System (UMTS) Terrestrial Radio Access (UTRA) to establish an air interface 190 using wideband CDMA (WCDMA). In doing so, the base station 170a-170b may implement protocols such as HSPA, HSPA+ optionally including HSDPA, HSUPA or both. Alternatively, a base station 170a-170b may establish an air interface 190 with Evolved UTMS Terrestrial Radio Access (E-UTRA) using LTE, LTE-A, and/or LTE-B. It is contemplated that the communication system 100 may use multiple channel access functionality, including such schemes as described above. Other radio technologies for implementing air interfaces include IEEE 802.11, 802.15, 802.16, CDMA2000, CDMA2000 1×, CDMA2000 EV-DO, IS-2000, IS-95, IS-856, GSM, EDGE, and GERAN. Other multiple access schemes and wireless protocols may be utilized.

The RANs 120a-120b are in communication with the core network 130 to provide the EDs 110a-110c with various services such as voice, data, and other services. The RANs 120a-120b and/or the core network 130 may be in direct or indirect communication with one or more other RANs (not shown), which may or may not be directly served by core network 130, and may or may not employ the same radio access technology as RAN 120a, RAN 120b or both. The core network 130 may also serve as a gateway access between (i) the RANs 120a-120b or EDs 110a-110c or both, and (ii) other networks (such as the PSTN 140, the internet 150, and the other networks 160). In addition, some or all of the EDs 110a-110c may include functionality for communicating with different wireless networks over different wireless links using different wireless technologies and/or protocols. Instead of wireless communication (or in addition thereto), the EDs may communicate via wired communication channels to a service provider or switch (not shown), and to the internet 150. PSTN 140 may include circuit switched telephone networks for providing plain old telephone service (POTS). Internet 150 may include a network of computers and subnets (intranets) or both, and incorporate protocols, such as IP, TCP, and UDP. EDs 110a-110c may be multimode devices capable of operation according to multiple radio access technologies, and incorporate multiple transceivers necessary to support such.

Figure 2:
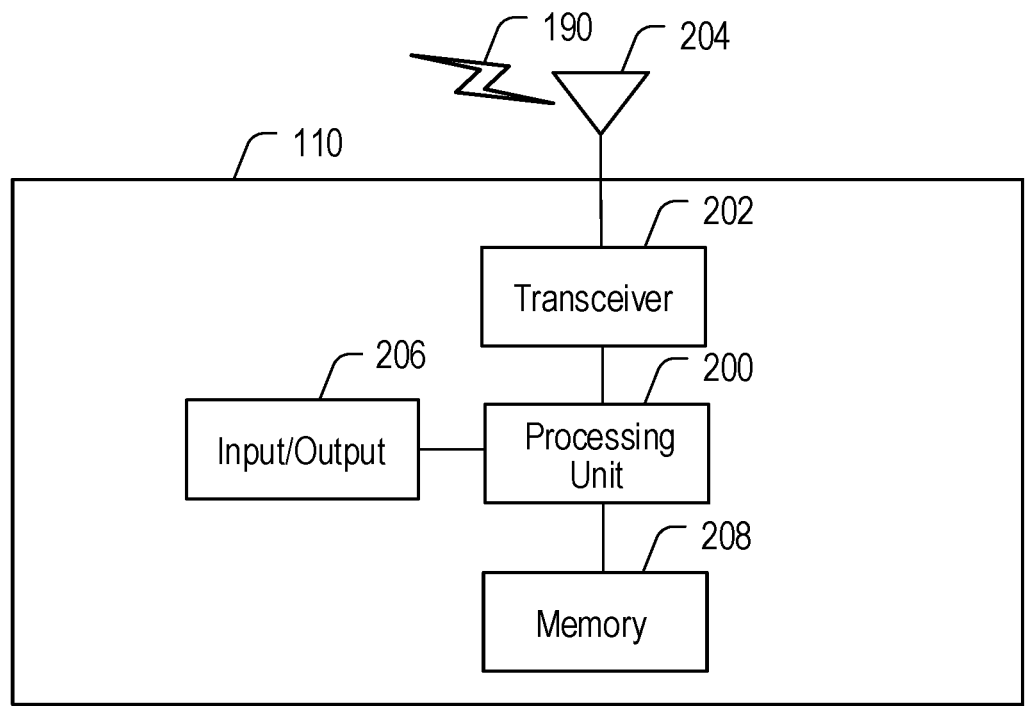
FIG. 2 is a block diagram of an example electronic device.
Figure 3:
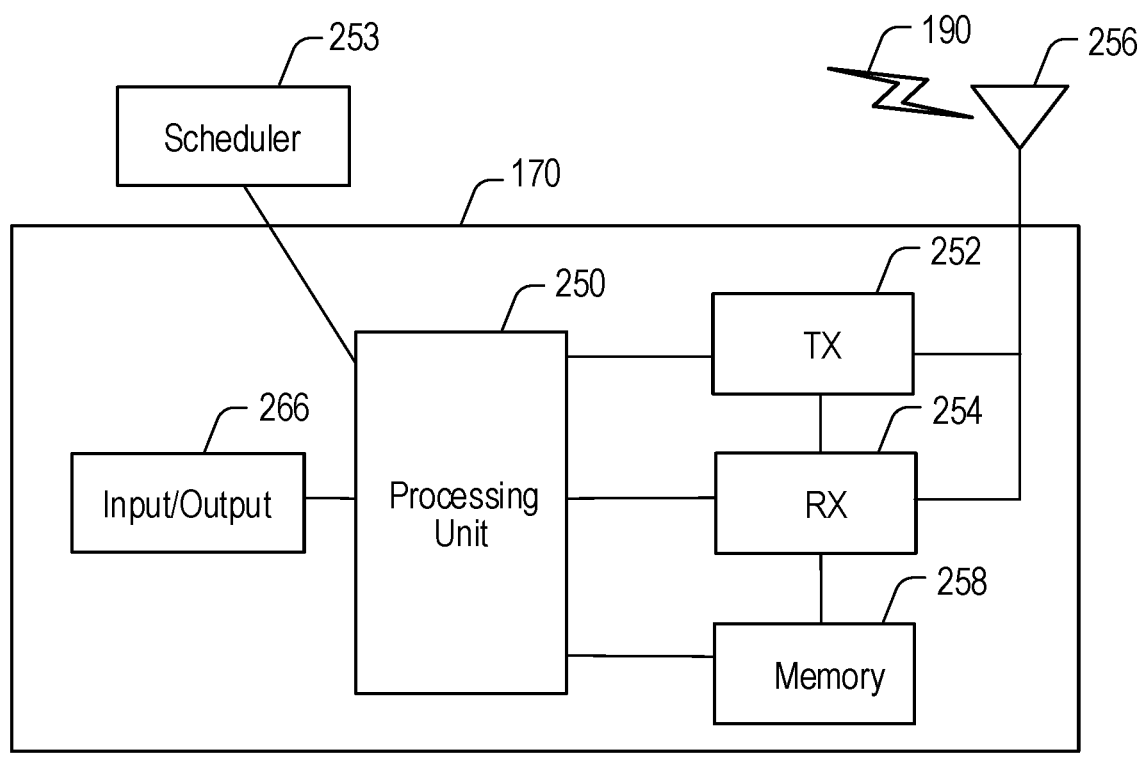
FIG. 3 is a block diagram of another example electronic device.

FIGS. 2 and 3 illustrate example devices that may implement the methods and teachings according to this disclosure. In particular, FIG. 2 illustrates an example ED 110, and FIG. 3 illustrates an example base station 170. These components could be used in the communication system 100 or in any other suitable system.

As shown in FIG. 2, the ED 110 includes at least one processing unit 200. The processing unit 200 implements various processing operations of the ED 110. For example, the processing unit 200 could perform signal coding, data processing, power control, input/output processing, or any other functionality enabling the ED 110 to operate in the communication system 100. The processing unit 200 may also be configured to implement some or all of the functionality and/or embodiments described in more detail herein. Each processing unit 200 includes any suitable processing or computing device configured to perform one or more operations. Each processing unit 200 could, for example, include a microprocessor, microcontroller, digital signal processor, field programmable gate array, or application specific integrated circuit.

The ED 110 also includes at least one transceiver 202. The transceiver 202 is configured to modulate data or other content for transmission by at least one antenna 204 or Network Interface Controller (NIC). The transceiver 202 is also configured to demodulate data or other content received by the at least one antenna 204. Each transceiver 202 includes any suitable structure for generating signals for wireless or wired transmission and/or processing signals received wirelessly or by wire. Each antenna 204 includes any suitable structure for transmitting and/or receiving wireless or wired signals. One or multiple transceivers 202 could be used in the ED 110. One or multiple antennas 204 could be used in the ED 110. Although shown as a single functional unit, a transceiver 202 could also be implemented using at least one transmitter and at least one separate receiver.

The ED 110 further includes one or more input/output devices 206 or interfaces (such as a wired interface to the internet 150). The input/output devices 206 permit interaction with a user or other devices in the network. Each input/output device 206 includes any suitable structure for providing information to or receiving information from a user, such as a speaker, microphone, keypad, keyboard, display, or touch screen, including network interface communications.

In addition, the ED 110 includes at least one memory 208. The memory 208 stores instructions and data used, generated, or collected by the ED 110. For example, the memory 208 could store software instructions or modules configured to implement some or all of the functionality and/or embodiments described herein and that are executed by the processing unit(s) 200. Each memory 208 includes any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

As shown in FIG. 3, the base station 170 includes at least one processing unit 250, at least one transmitter 252, at least one receiver 254, one or more antennas 256, at least one memory 258, and one or more input/output devices or interfaces 266. A transceiver, not shown, may be used instead of the transmitter 252 and receiver 254. A scheduler 253 may be coupled to the processing unit 250. The scheduler 253 may be included within or operated separately from the base station 170. The processing unit 250 implements various processing operations of the base station 170, such as signal coding, data processing, power control, input/output processing, or any other functionality. The processing unit 250 can also be configured to implement some or all of the functionality and/or embodiments described in more detail herein. Each processing unit 250 includes any suitable processing or computing device configured to perform one or more operations. Each processing unit 250 could, for example, include a microprocessor, microcontroller, digital signal processor, field programmable gate array, or application specific integrated circuit.

Each transmitter 252 includes any suitable structure for generating signals for wireless or wired transmission to one or more EDs or other devices. Each receiver 254 includes any suitable structure for processing signals received wirelessly or by wire from one or more EDs or other devices. Although shown as separate components, at least one transmitter 252 and at least one receiver 254 could be combined into a transceiver. Each antenna 256 includes any suitable structure for transmitting and/or receiving wireless or wired signals. Although a common antenna 256 is shown here as being coupled to both the transmitter 252 and the receiver 254, one or more antennas 256 could be coupled to the transmitter(s) 252, and one or more separate antennas 256 could be coupled to the receiver(s) 254. Each memory 258 includes any suitable volatile and/or non-volatile storage and retrieval device(s) such as those described above in connection to the ED 110. The memory 258 stores instructions and data used, generated, or collected by the base station 170. For example, the memory 258 could store software instructions or modules configured to implement some or all of the functionality and/or embodiments described above and that are executed by the processing unit(s) 250.

Each input/output device 266 permits interaction with a user or other devices in the network. Each input/output device 266 includes any suitable structure for providing information to or receiving/providing information from a user, including network interface communications.

Figure 4:
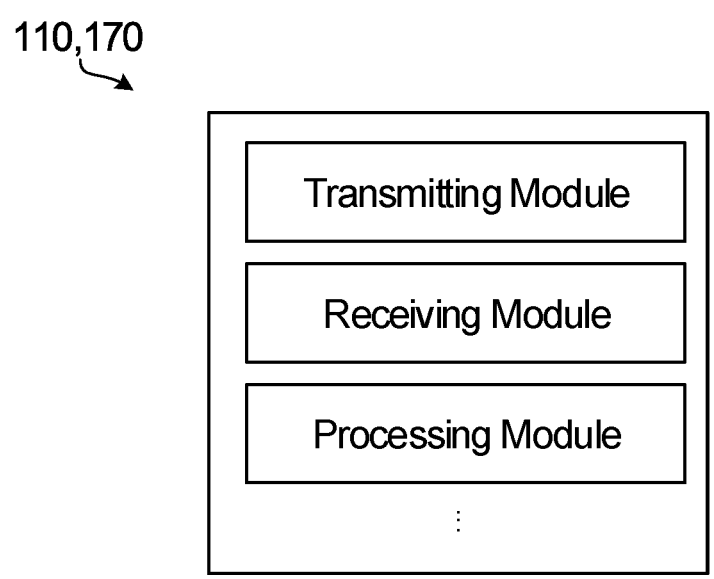
FIG. 4 is a block diagram of example component modules.

One or more steps of the embodiment methods provided herein may be performed by corresponding units or modules, according to FIG. 4. FIG. 4 illustrates units or modules in a device, such as in ED 110 or base station 170. For example, a signal may be transmitted by a transmitting unit or a transmitting module. A signal may be received by a receiving unit or a receiving module. A signal may be processed by a processing unit or a processing module. The processing module may encompass the units/modules described later, such as the encoder and decoder described below. Other units/modules may be included in FIG. 4, but are not shown. The respective units/modules may be hardware, software, or a combination thereof. For instance, one or more of the units/modules may be an integrated circuit, such as field programmable gate arrays (FPGAs) or application-specific integrated circuits (ASICs). It will be appreciated that where the modules are software, they may be retrieved by a processor, in whole or part as needed, individually or together for processing, in single or multiple instances as required, and that the modules themselves may include instructions for further deployment and instantiation.

Additional details regarding the EDs 110 and the base stations 170 are known to those of skill in the art. As such, these details are omitted here for clarity.

Figure 5:
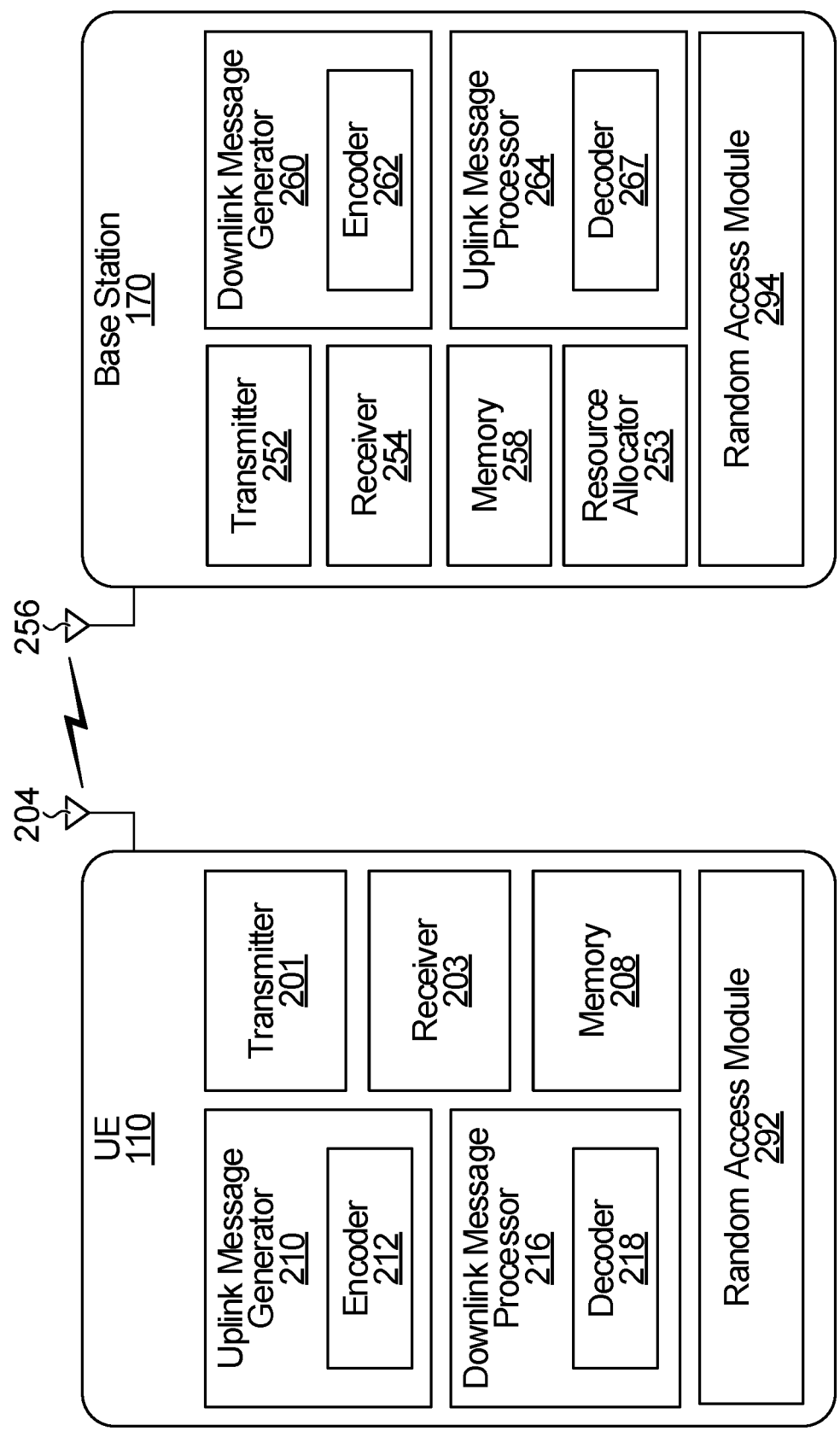
FIG. 5 is a block diagram of an example user equipment and base station.

FIG. 5 illustrates another example of an ED 110 and a base station 170. The ED 110 will hereafter be referred to as a user equipment (UE) 110.

The base station 170 may be called other names in some implementations, such as a transmit and receive point (TRP), a base transceiver station, a radio base station, a network node, a transmit/receive node, a Node B, an evolved NodeB (eNodeB or eNB), a gNB, a relay station, or a remote radio head. In some embodiments, the functions of the base station 170 may be distributed. For example, some of the modules of the base station 170 may be located remote from the equipment housing the antennas of the base station 170, and may be coupled to the equipment housing the antennas over a communication link (not shown). Therefore, in some embodiments, the term base station 170 may also refer to modules on the network side that perform processing operations, such as resource grant/allocation, message generation, and encoding/decoding, and that are not necessarily part of the equipment housing the antennas of the base station 170. The modules may also be coupled to other base stations. In some embodiments, the base station 170 may actually be a plurality of base stations that are operating together to serve the UE 110, e.g. through coordinated multipoint transmissions.

The base station 170 includes a transmitter 252 and a receiver 254 coupled to one or more antennas 256. Only one antenna 256 is illustrated. The transmitter 252 and the receiver 254 may be integrated as a transceiver. The base station 170 further includes a downlink message generator 260 for generating a downlink transmission to be sent to the UE 110, e.g. for generating the downlink transmissions described herein. The downlink message generator 260 includes an encoder 262 for encoding the data to be sent in the downlink transmission. The downlink message generator 260 may be part of the transmitter 252. The base station 170 further includes an uplink message processor 264 for processing uplink transmissions received from the UE 110, e.g. for processing the uplink transmissions described herein. The uplink message processor 264 includes a decoder 267 for decoding uplink transmissions. The uplink message processor 264 may be part of the receiver 254. The base station 170 further includes a resource allocator 253, which may schedule the uplink resources granted to UE 110 for uplink transmissions, and which may also schedule downlink transmissions. For example, the resource allocator 253 may be used to schedule the resources granted for transmitting Msg 3 discussed later. The base station 170 further includes a random access module 294, which controls the base station 170 to perform the base station steps of the random access procedures described herein. For example, the random access module 294 may perform operations such as generating the random access channel configuration information, mapping random access channel preambles to uplink data channel resources, generating the timing advance and power adjustment parameters, processing the content of Msg 1 and Msg 3 described later, etc. The base station 170 further includes a memory 258 for storing information and data.

The downlink message generator 260, the encoder 262, the uplink message processor 264, the decoder 267, the resource allocator 253, the random access module 294, and/or any signal processing components of the transmitter 252 and receiver 254, may be implemented in the form of circuitry configured to perform the functions of the downlink message generator 260, the encoder 262, the uplink message processor 264, the decoder 267, the resource allocator 253, the random access module 294, and/or the transmitter 252 and receiver 254. In some implementations the circuitry includes memory 258 and one or more processors, such as processing unit 250 described earlier, that execute instructions that cause the one or more processors to perform the operations of the downlink message generator 260, the encoder 262, the uplink message processor 264, the decoder 267, the resource allocator 253, the random access module 294, and/or the transmitter 252 and receiver 254. Alternatively, the downlink message generator 260, the encoder 262, the uplink message processor 264, the decoder 267, the resource allocator 253, the random access module 294, and/or the transmitter 252 and receiver 254, may be implemented by a processing unit using dedicated integrated circuitry, such as an ASIC, a GPU, or an FPGA for performing the operations of the downlink message generator 260, the encoder 262, the uplink message processor 264, the decoder 267, the resource allocator 253, the random access module 294, and/or the transmitter 252 and receiver 254.

The UE 110 also includes a transmitter 201 and a receiver 203 coupled to one or more antennas 204. Only one antenna 204 is illustrated. The transmitter 201 and the receiver 203 may be integrated as a transceiver, e.g. transceiver 202. The UE 110 further includes a downlink message processor 216, including a decoder 218. The downlink message processor 216 and decoder 218 perform operations relating to processing received downlink messages, e.g. processing the downlink messages described herein. The downlink message processor 216 may be part of the receiver 203. The UE 110 further includes an uplink message generator 210, including an encoder 212. The uplink message generator 210 and encoder 212 perform operations relating to generating uplink transmissions, e.g. generating the uplink transmissions described herein. The uplink message generator 210 may be part of the transmitter 201. The UE 110 further includes a corresponding random access module 292, which controls the UE 110 to perform the UE steps of the random access procedures described herein. For example, the random access module 292 may perform operations such as receiving and accessing the association between the random access preambles and the uplink data channel resources, selecting an uplink data channel resource based on a selected random access preamble, processing the contents of Msg B described later, switching from a two-step random access procedure to a four-step random access procedure, etc. The UE 110 further includes a memory 208 for storing information and data.

The downlink message processor 216, the decoder 218, the uplink message generator 210, the encoder 212, the random access module 292, and/or any signal processing components of the transmitter 201 and receiver 203, may be implemented in the form of circuitry configured to perform the functions of the downlink message processor 216, the decoder 218, the uplink message generator 210, the encoder 212, the random access module 292, and/or the transmitter 201 and receiver 203. In some implementations the circuitry includes memory 208 and one or more processors, such as processing unit 200 described earlier, that execute instructions that cause the one or more processors to perform the operations of the downlink message processor 216, the decoder 218, the uplink message generator 210, the encoder 212, the random access module 292, and/or the transmitter 201 and receiver 203. Alternatively, the downlink message processor 216, the decoder 218, the uplink message generator 210, the encoder 212, the random access module 292, and/or the transmitter 201 and receiver 203, may be implemented by a processing unit using dedicated integrated circuitry, such as an ASIC, a GPU, or an FPGA for performing the operations of the downlink message processor 216, the decoder 218, the uplink message generator 210, the encoder 212, the random access module 292, and/or the transmitter 201 and receiver 203.

The base station 170 and the UE 110 may include other components, but these have been omitted for the sake of clarity.

Random Access Procedures

Random access procedures are described below. In each embodiment described below, the random access channel may be a physical random access channel (PRACH), and the uplink data channel may be a physical uplink shared channel (PUSCH).

Figure 6:
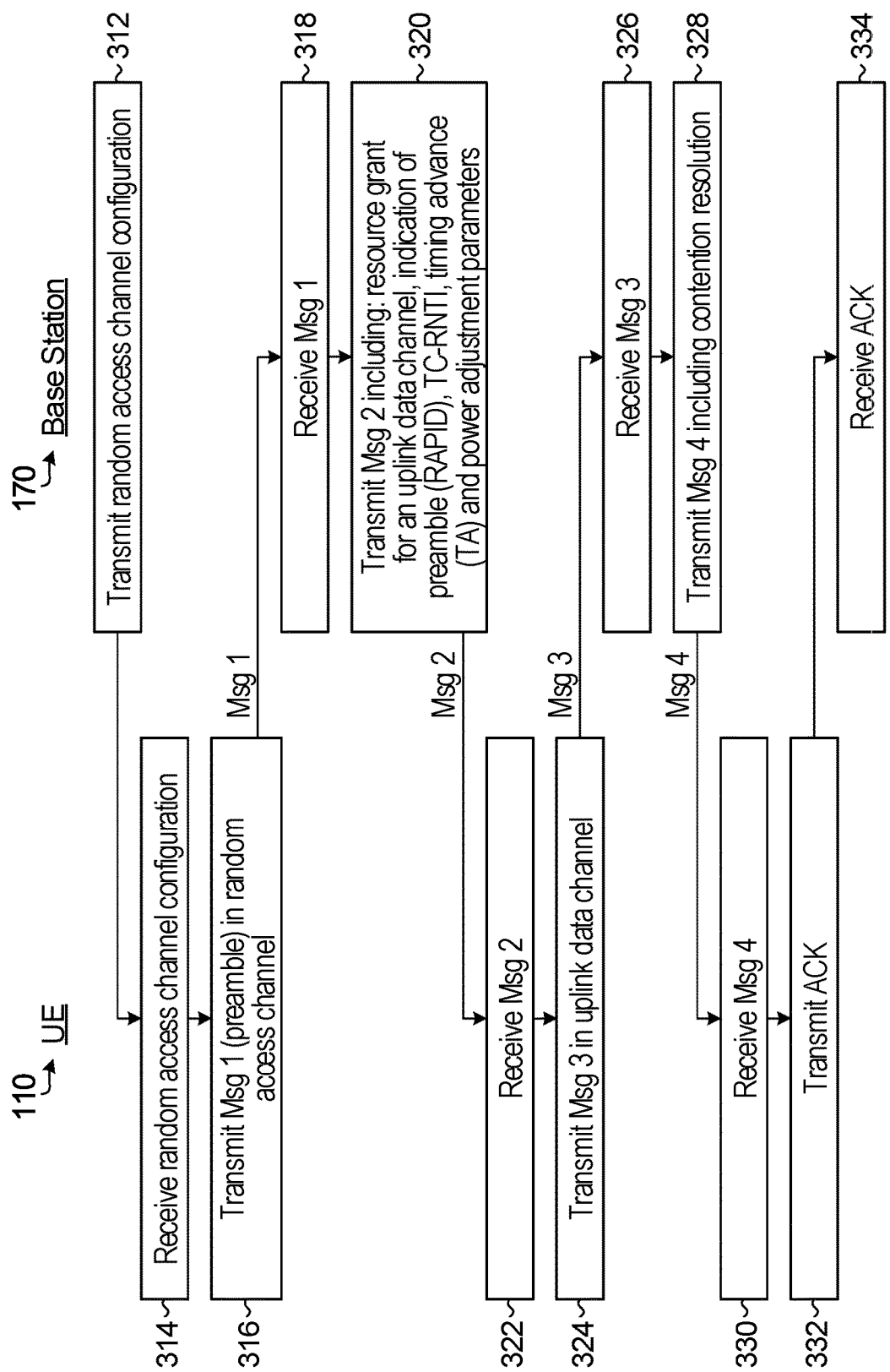
FIG. 6 is a flowchart illustrating steps of a contention-based random access procedure, according to one embodiment.

FIG. 6 is a flowchart illustrating steps of a contention-based random access procedure, according to one embodiment. The random access procedure is a four-step random access procedure because it involves the exchange of four messages Msg 1, Msg 2, Msg 3, and Msg 4, as described below. Msg 1 and Msg 3 are transmitted by the UE 110 to the base station 170, and Msg 2 and Msg 4 are transmitted as responses by the base station 170 to UE 110.

In step 312, the base station 170 transmits configuration information that configures the resources of a random access channel. The configuration information includes at least:

(1) An indication of a set of preambles that may be transmitted, by UEs, on the random access channel. The preambles may be referred to as random access preambles because they are for transmission on a random access channel as part of a random access procedure. Also, a preamble may sometimes be referred to as a preamble sequence. The set of preambles may be indicated by providing root sequence and cyclic shift information.

(2) An indication of the time-frequency resources on the random access channel at which UEs may transmit the preambles. The indication may include a random access channel index.

Other information may also be included in the configuration information, for example: the format of the preambles, e.g. short-format or long-format; subcarrier spacing for the uplink transmission on the random access channel; carrier frequency for the uplink transmission on the random access channel; precoding for Msg 3.

The configuration information may be broadcast by base station 170, e.g. as part of a synchronization signal block (SSB)/physical broadcast channel (PBCH). The configuration information may be carried in system information. In alternative embodiments, depending on the scenario, the configuration information may instead be transmitted in higher-layer signaling, such as in radio resource control (RRC) signaling for a UE that is in an RRC connected state. In alternative embodiments, depending on the scenario, the configuration information may instead be transmitted in downlink control information (DCI) or using MAC CE.

In step 314, UE 110 receives the random access channel configuration information that was transmitted by the base station 170 in step 312. When the configuration information is broadcast by the base station 170, e.g. on a broadcast channel for initial network access, other UEs may also receive the configuration information.

The UE 110 randomly selects a preamble, e.g. preamble index i, from the set of usable preambles indicated in the configuration information received in step 314. In step 316, the UE 110 transmits the selected preamble on the random access channel to the base station 170. The message including the preamble is referred to as Msg 1. In step 318, Msg 1 is received by the base station 170.

The base station 170 detects the preamble transmitted by the UE 110, and in response the base station 170 transmits a response, which is sometimes called a random access response (RAR). The response is transmitted in step 320 on a downlink channel, e.g. on a downlink data channel, such as a PDSCH. The response is transmitted within a RAR time window, and the response corresponds to the preamble received in step 318. The response includes information referred to as Msg 2. Msg 2 includes two components:

Component 1: A resource grant for a transmission on an uplink data channel. The resource grant may instead be called a resource allocation or preconfiguration. The words 'grant' and 'allocation' will be used interchangeably herein. The resource grant includes a plurality of transmission parameters, which are used by the UE 110 to transmit Msg 3 discussed below. The transmission parameters may include parameters such as: time-frequency resource allocation in the uplink data channel; resource index; frequency hopping flag; modulation and coding scheme (MCS) to be used for the uplink data transmission; transmission power control (TPC) for the uplink data transmission; channel state information (CSI); demodulation reference signal (DMRS).

Component 2: Other information, some or all of which may be dependent upon Msg 1. Examples of the other information include:
 (1) Random access preamble identifier (RAPID), i.e. an identity of the random access preamble that was sent in Msg 1. The UE 110 determines that Msg 2 is for UE 110 when the RAPID matches the preamble sent by UE 110 in Msg 1.
 (2) The timing advance (TA) value to be used by UE 110 for uplink synchronization. The TA value is determined by the base station 170 based on the received transmission of Msg 1.
 (3) One or more power adjustment parameters to be used by UE 110 for uplink transmissions. Power adjustment parameters are determined by the base station 170 based on the received transmission of Msg 1.
 (4) A temporary identifier for the UE, e.g. a radio network temporary identifier (RNTI), such as a temporary cell RNTI (TC-RNTI).

In step 322, the UE 110 receives Msg 2. In step 324, the UE 110 sends an uplink data transmission in the uplink data channel using the resource grant present in Component 1 of Msg 2. The information sent in the uplink data transmission in step 324 includes Msg 3. Msg 3 includes:
 (1) Data to be sent from the UE 110 to the base station 170. The exact data sent is implementation specific and depends upon the reason for which the random access procedure is being performed. For example, for initial network access the data may include RRC connection request information. As another example, in some other scenarios the data may include RRC reconnection request information.
 (2) A contention resolution identity, e.g. an identifier of UE 110 (UE ID) and/or a random value. The contention resolution identity is used for contention resolution in the manner described below.

The transmission of Msg 3 in the uplink data channel is performed by UE 110 using the TA and power adjustment indicated in Component 2 of Msg 2.

In step 326, the base station 170 receives Msg 3 in the uplink data channel. The data sent in Msg 3 is decoded. In step 328, the base station 170 transmits a response on a downlink channel, e.g. on a downlink data channel such as a PDSCH. The response carries information referred to as Msg 4. Msg 4 includes:
 (1) Information from the base station 170 in response to the uplink data sent from UE 110 in Msg 3. For example, in the case of initial network access, Msg 4 may include connection confirmation information.
 (2) The conflict resolution identity received in Msg 3. A conflict or collision occurs if in step 316 another UE also happened to have transmitted the same preamble as UE 110 in the same time-frequency resources of the random access channel. In an example, the base station 170 detects the preamble transmission of UE 110 and not the other UE's preamble transmission. Msg 2 is for UE 110, but the other UE incorrectly determines that Msg 2 is for the other UE because of a matching RAPID in Msg 2. The presence of the contention identity of UE 110 in Msg 4 indicates to the other UE that its random access procedure was not successful. UE 110 will detect a valid contention identity and thereby determine that UE 110's random access procedure was successful.

In step 330, UE 110 receives the downlink transmission of Msg 4 and concludes that Msg 4 is for UE 110 and that the random access procedure was successful because a valid contention resolution identity is decoded by UE 11. In step 332, UE 110 transmits an acknowledgement (ACK) to the base station 110 on an uplink channel, e.g. on an uplink control channel such as a physical uplink control channel (PUCCH). The ACK is received by the base station 170 at step 334.

In some embodiments, the UE 110 retransmits Msg 1 with the same or different preamble if the transmission of Msg 2 is not received, or if the contention resolution identity in Msg 4 invalid. In some embodiments, the base station 170 uses DCI to schedule UE 110 to retransmit Msg 3 when no valid Msg 3 is detected by the base station 110 on the granted uplink data channel resource.

The random access procedure described in relation to FIG. 6 is a contention-based random access procedure because the same preamble may possibly be used by different UEs on the same time-frequency resources of the random access channel. A contention-free random access procedure may instead be performed using a variation of FIG. 6 in which a dedicated preamble is assigned to UE 110 and used by UE 110 in Msg 1. In a contention-free random access procedure, Msg 3 and Msg 4 may omit the contention resolution identity value. Contention-free random access is less applicable to initial network access and more applicable to situations in which the UE 110 is already in an RRC connected state and needs to perform the random access procedure for synchronization purposes, e.g. during a handover. Depending upon the implementation, the preamble specifically assigned to UE 110 may be transmitted in DCI, MAC CE, or in higher layer signaling, e.g. in an RRC configuration message.

The four-step random access procedure described in relation to FIG. 6 may have an unacceptable level of latency and/or an unacceptable level of signaling overhead. The latency and/or signaling overhead may place a limit on certain applications, e.g. some new radio (NR) applications that require: fast network entry/initial access; and/or fast connection set-up; and/or fast state transitions; and/or fast uplink synchronization upon data arrival; and/or more effective data transmissions upon uplink out-of-synchronization.

Also, in some scenarios the base station 170 may trigger a random access procedure, e.g., in NR. For example, if a downlink (DL) physical downlink control channel (PDCCH) scheduling with the CRC of the DCI format 1_0 is scrambled by C-RNTI and the "frequency domain resource assignment" field in the DCI are all ones, a random access procedure is initiated by the PDCCH signaling.

Figure 7:
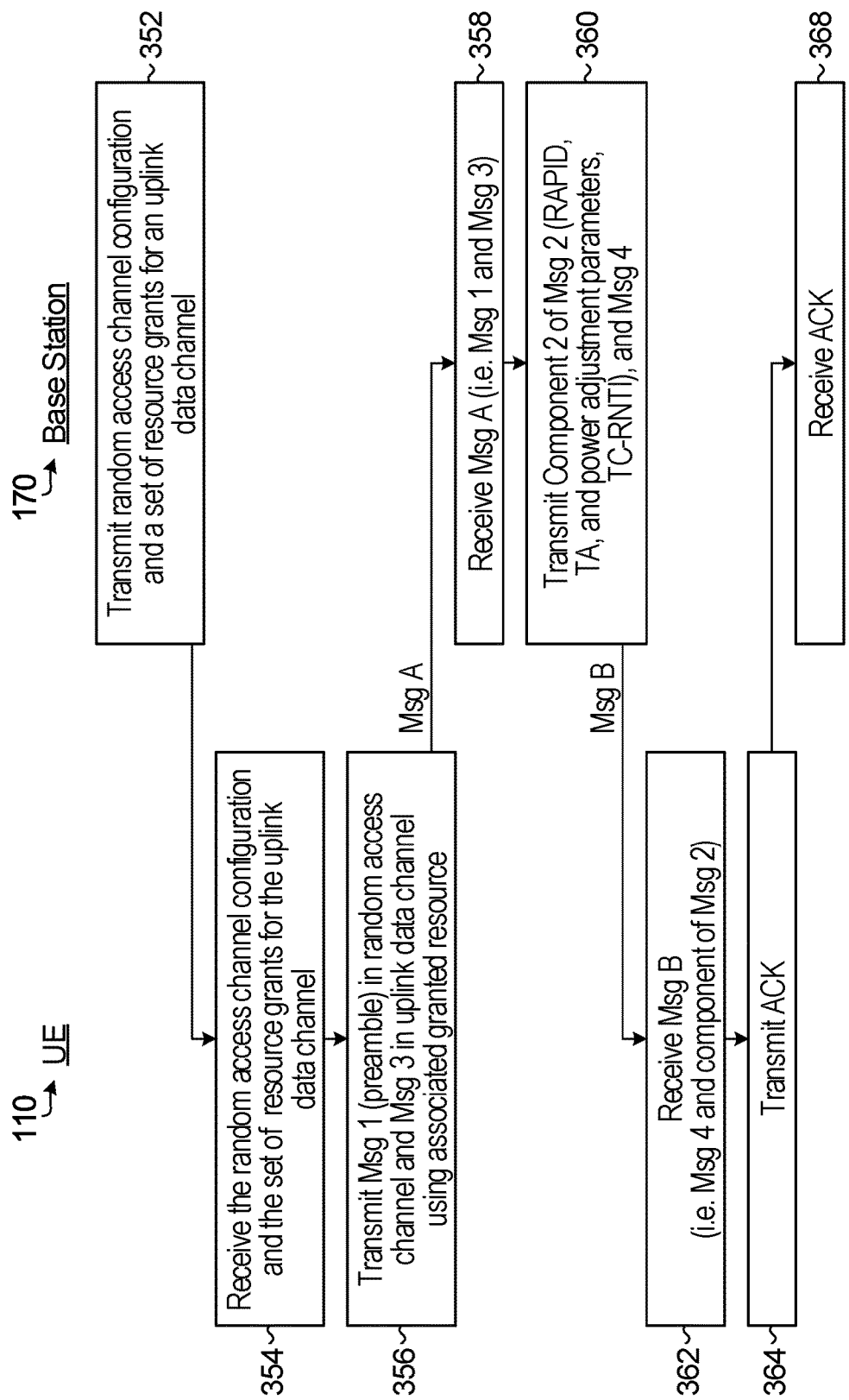
FIG. 7 is a flowchart illustrating steps of a contention-based two-step random access procedure, according to one embodiment.

FIG. 7 is a flowchart illustrating steps of a contention-based two-step random access procedure, according to one embodiment. The number of message exchanges is reduced compared to the four-step random access procedure described in relation to FIG. 6, and so latency and/or signaling overhead may be reduced compared to the four-step random access procedure described in relation to FIG. 6.

In step 352, the base station transmits:

(1) Configuration information that configures the resources of a random access channel. This is the same configuration information as transmitted in step 312 of FIG. 6. The configuration information includes at least an indication of a set of preambles that may be transmitted on the random access channel and an indication of the time-frequency resources on the random access channel at which the preambles may be transmitted, which may include a random access channel index. The other configuration information discussed above in relation to step 312 of FIG. 6 may also be included, for example: preamble format for short or long preamble sequences; subcarrier spacing; carrier frequency; precoding for Msg 3. In some embodiments, the configured preambles and random access channels in FIG. 7 can be different from the ones in FIG. 6 to support co-existence of: (i) UEs with capability of four-step random access procedure (e.g. legacy UEs), and (ii) UEs with capability of two-step random access procedure or of both four-step and two-step random access procedures (or data transmissions).

(2) A set of resource grants for a set of uplink data channels. The set of uplink data channels may in some embodiments just be a single uplink data channel. Each resource grant includes a time-frequency resource allocation for or defining one of the set of uplink data channels for the Msg 3 transmission. Each resource grant also includes a respective plurality of other transmission parameters. The other transmission parameters for a resource grant may include parameters such as: frequency hopping flag; MCS to be used for the uplink data transmission; TPC for the uplink data transmission; CSI; DMRS. The transmission parameters in a resource grant are used to transmit Msg 3 in an uplink data channel. The set of resource grants, which can be indicated by a resource index, may be referred to as Msg 3 resource configuration. Moreover, the Msg 3 resource allocation (or the resource index for Msg 3) may have an association or mapping with preamble sequence(s) and/or random access channel(s), as discussed later.

In some embodiments, downlink transmission 352 may be broadcast by base station 170, e.g. as part of a SSB/PBCH. In other embodiments, some or all of the information in downlink transmission 352 may be transmitted in higher-layer signaling, such as in RRC signaling, MAC CE, or in DCI. Examples are discussed later.

In step 354, UE 110 receives the information transmitted by the base station 170 in step 352. When the information is broadcast by the base station 170, e.g. on a broadcast channel for initial network access, other UEs may also receive the same information.

The UE 110 randomly selects a preamble from the set of usable preambles indicated in the information received in step 354. The UE 110 also selects an associated resource grant from the set of resource grants indicted in the information received in step 354. Examples of how the UE 110 decides which resource grant to select are discussed later.

In step 356, the UE 110 transmits Msg 1, which includes the selected preamble, on the random access channel to the base station 170. In step 356, the UE 110 also sends an uplink data transmission on the uplink data channel using the transmission parameters of the selected resource grant. The uplink transmission on the uplink data channel carries Msg 3, which includes:

(1) Data to be sent from the UE 110 to the base station 170. The exact data sent is implementation specific and depends upon the reason for which the random access procedure is being performed. For example, for initial network access the data may include RRC connection request information. As another example, in some other scenarios the data may include RRC reconnection request information. As another example, the data may include UE uplink data traffic.

(2) A contention resolution identity, e.g. an identifier of UE 110 (UE ID) and/or a random value. The contention resolution identity is used for contention resolution in the manner described herein.

(3) Optionally a UE capability report, e.g., indicating whether the UE 110 supports a two-step random access procedure, a four-step random access procedure, or both random access procedures.

There is no uplink TA or power adjustment information from the base station 170 for the UE 110 to use for transmission of Msg 3 in step 356 of FIG. 7. The absence of the uplink TA and power adjustment for transmitting Msg 3 is a possible drawback compared to the four-step random access procedure described in relation to FIG. 6. However, the two-step random access procedure of FIG. 7 has the possible benefit of fewer message exchanges and reduced latency compared to the four-step random access procedure of FIG. 6.

Msg 1 and Msg 3 transmitted in step 356 may sometimes be referred to collectively as Msg A, even though Msg 1 and Msg 3 are not transmitted as a single message, but are transmitted as two different messages on two different uplink channels, coupled together using time-division multiplexing (TDM), frequency-division multiplexing (FDM) or a combination of both.

In step 358, the base station 170 receives Msg 1 carrying the preamble in the random access channel, and the base station 170 also receives Msg 3 in the uplink data channel. The base station 170 knows the uplink resource of the uplink data channel on which to receive Msg 3 based on an association between the preamble and the resource grant, as explained later. Msg 1 is detected and decoded by the base station 170. The base station 170 can then obtain information including the UE uplink timing, Msg 3 transmission allocation, the UE transmission parameters, the UE identification, and/or channel estimation, etc. Then the uplink data of Msg 3 can be decoded.

After detecting and correctly decoding both Msg 1 and Msg 3, in step 360 the base station 170 transmits a response on a downlink channel, e.g. on a downlink data channel such as a PDSCH. The response carries Msg B. Msg B includes:

(1) The rest of the information of Msg 2 that was not transmitted in step 352 and that is dependent upon Msg 1, e.g. Component 2 of Msg 2 described earlier, which includes: the RAPID sent by UE 110; the TA value for UE 110; one or more power adjustment parameters to be used by UE 110; a temporary ID for UE 110, e.g. a TC-RNTI.

(2) Msg 4, which includes: the information from the base station 170 in response to the uplink data sent from UE 110 in Msg 3, e.g. connection confirmation information; and/or the conflict resolution identity received in Msg 3.

(3) Optionally, UE ACK/NACK feedback configuration for Msg B that includes an uplink control channel allocation such as a PUCCH channel, and the feedback time information such as feedback delay(s), etc. Note that it is possible that the UE ACK/NACK feedback configuration can be done after the two-step RACH procedure by higher-layer signaling and/or Li signaling for data transmissions.

In step 362, the UE 110 receives the downlink transmission of Msg B and concludes that Msg B is for UE 110 and that the random access procedure was successful because a valid contention resolution identity is decoded by UE 110. In step 364, UE 110 transmits an acknowledgement (ACK) to the base station 110 on an uplink channel, e.g. on an uplink control channel such as a PUCCH. The ACK is received by the base station in step 368. The ACK is not necessarily transmitted in all embodiments. However, if the ACK is transmitted then the ACK transmission uses the TA and power adjustment information provided to UE 110 in Msg B.

In other embodiments, at step 356 Msg 3 is used for a grant-free (GF) data transmission. The GF data transmission may be sent when UE 110 is out-of-uplink-synchronization, for example based on a time-out, beam transmission failure, changing mobility, upon traffic arrival in Inactive state or Idle state, etc. In this situation, Msg B may also function as an ACK/NACK feedback. Msg B may include: the RAPID sent by UE 110; the TA value for UE 110; one or more power adjustment parameters to be used by UE 110; a temporary ID for UE 110, e.g. a configured scheduling RNTI (CS-RNTI) instead of TC-RNTI for GF data transmission. UE 110 can directly perform at step 364 a subsequent uplink data transmission, e.g. an uplink grant-free data transmission using the TA and power adjustment provided to UE 110 in Msg B. In some embodiments, the UE only transmits uplink data in an Msg 3 uplink channel, without transmitting the preamble in the subsequent random access channel to save transmission overhead and resources, at least for a period of time due to the fact that the UE has just adjusted its uplink timing to make the UE uplink synchronized. The Msg 3 uplink channel for the subsequent data transmission may be allocated based on the association between the subsequent random access channel and the previously used preamble, to be discussed later.

In some embodiments, the ACK is inherent by the presence of a subsequent uplink data transmission using the TA and power adjustment provided in Msg B.

The two-step random access procedure described in relation to FIG. 7 is a contention-based random access procedure. A two-step contention-free random access procedure may instead be performed using a variation of FIG. 7 in which a dedicated preamble is assigned to UE 110 and used by UE 110 in Msg 1. In a contention-free random access procedure, Msg 3 and Msg 4 may omit the contention resolution identity value.

Association Between Preambles and Msg 3 Resources for Two-Step Random Access

In some embodiments, there is an association, e.g. a mapping, between: (1) a preamble available to be transmitted on the random access channel, and (2) a resource grant for use in sending uplink data, e.g. Msg 3, on an uplink data channel. Different embodiments are discussed below in the context of different example scenarios.

Example Scenario 1—No RRC Connection Available:

There may be situations in which the two-step random access procedure is to be performed when the UE 110 is not in an RRC connected state, e.g. upon initial network access, or when the UE 110 is in an inactive or idle state.

Figure 8:
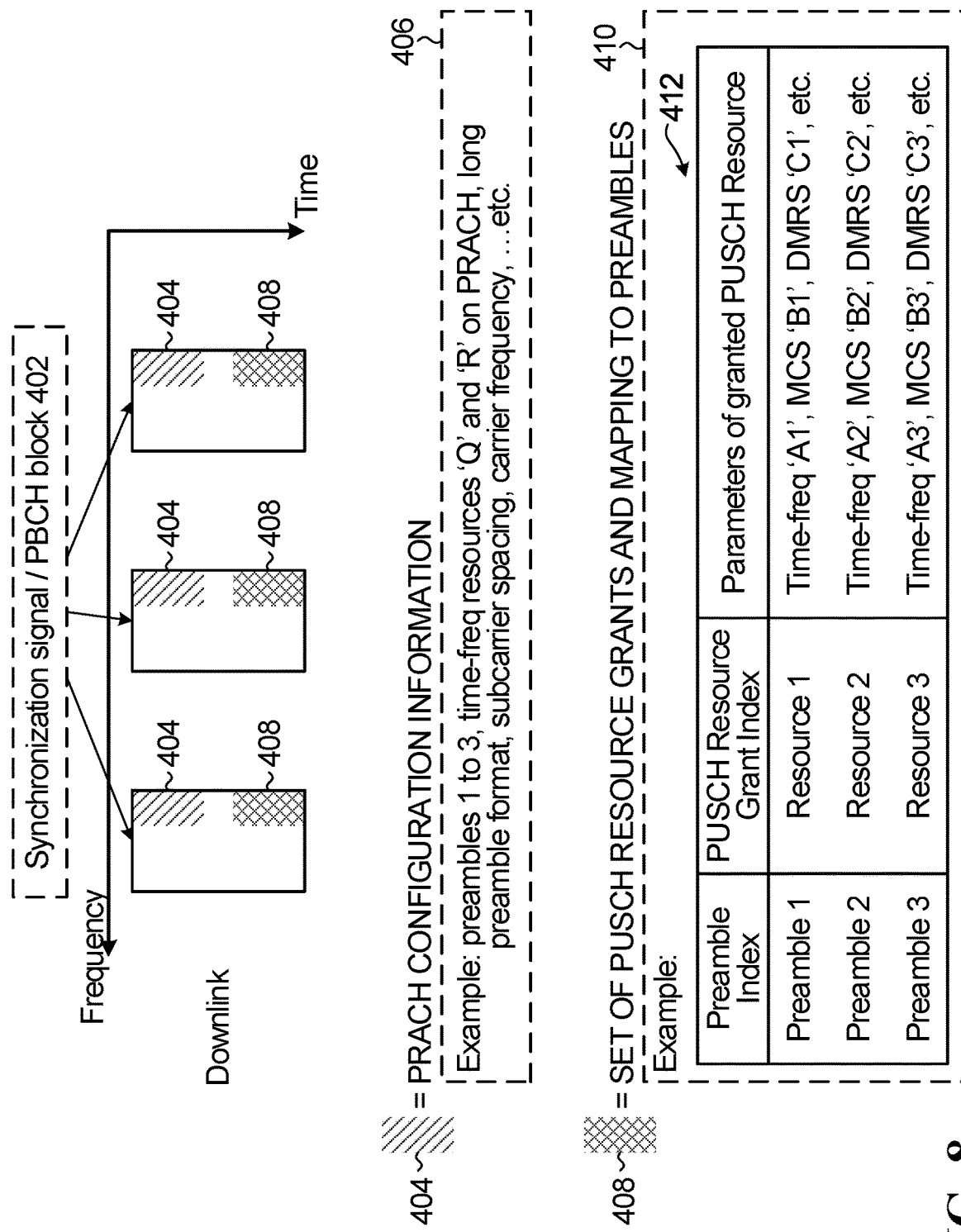
FIG. 8 illustrates downlink time-frequency resources including a plurality of synchronization signal/PBCH blocks, according to one embodiment.

To accommodate UEs not in an RRC connected state, the random access channel configuration information and the set of resource grants transmitted at step 352 of FIG. 7 may be transmitted on synchronization and broadcast (such as PBCH) channels. In some embodiments, the random access channel configuration information may be transmitted at one time-frequency location in one control/signaling channel, and the set of resource grants may be transmitted at another location in another control/signaling channel. For example, FIG. 8 illustrates downlink time-frequency resources including a plurality of synchronization signal/PBCH blocks 402, according to one embodiment. At time-frequency resource 404 in each PBCH block, random access channel configuration information is transmitted. The random access channel in the example is PRACH. An example of PRACH configuration information that is transmitted on time-frequency resource 404 is shown in stippled box 406 and includes: the set of preambles, which in this example is only three preambles 1 to 3 that can be indicated explicitly or implicitly, such as by root index and cyclic shifts for Zadoff-Chu (ZC) sequences; the time-frequency resources in PRACH on which the preambles may be transmitted, which in this example is time-frequency resource 'Q' and 'R' in PRACH; the preamble format, which in this example is the long sequence format; the subcarrier spacing for the uplink transmission on PRACH; the carrier frequency of the uplink transmission on PRACH.

At time-frequency resource 408 of each PBCH block, the base station 170 transmits the set of resource grants for the uplink data channel. Each resource grant or allocation includes the basic transmission parameters including time-frequency resources for data transmission location(s), periodicity, hopping, MCS, bandwidth part, numerology, and optionally DMRS/repetition/redundant pattern, etc. In the example in FIG. 8, the uplink data channel is a PUSCH.

In some embodiments, there is a one-to-one mapping between a random access channel preamble and a corresponding uplink data channel resource grant (or allocation) for a given period of resource slots. An example is illustrated in stippled box 410 of FIG. 8. The set of resource grants for the PUSCH includes three resource grants respectively indexed as: Resource 1, Resource 2, and Resource 3. The information transmitted by the base station 170 at time-frequency resource 408 includes a table 412. The table 412 indicates a one-to-one mapping between each preamble and a corresponding one of the resource grants. In the example, the last column of the table 412 specifies the transmission parameters of each resource grant. The resource grant indexed as Resource 1 grants the following transmission parameters, e.g.: time-frequency location 'A1' in the PUSCH; MCS 'B1' used for the uplink data transmission in the PUSCH; DMRS'C1' used for the uplink transmission in the PUSCH; etc. The resource grant indexed as Resource 2 grants the following transmission parameters, e.g.: time-frequency location 'A2' in the PUSCH; MCS 'B2' used for the uplink data transmission in the PUSCH; DMRS 'C2' used for the uplink transmission in the PUSCH; etc. The resource grant indexed as Resource 3 grants the following transmission parameters, e.g.: time-frequency location 'A3' in the PUSCH; MCS 'B3' used for the uplink data transmission in the PUSCH; DMRS 'C3' used for the uplink transmission in the PUSCH; etc. In other embodiments, there can be a time or/and frequency association between a random access channel location for transmitting the random access channel preamble and the corresponding uplink data channel resource location for transmitting uplink traffic; moreover, in some embodiments relative time or/and frequency location between the random access channel and the corresponding uplink data channel resource can be preconfigured or predefined by RRC, MAC CE, and/or other higher-layer signaling.

In the example in FIG. 8, one of the preambles 1 to 3 is selected by UE 110 and transmitted on the PRACH as part of step 356 of the two-step random access procedure described in FIG. 7. The UE 110 knows from the mapping in table 412 which resource to use in the PUSCH to transmit Msg 3 in step 356 of FIG. 7. For example, if the UE 110 selects preamble 2, then Msg 3 is sent in the PUSCH using the granted resource indexed as Resource 2. The base station 170 also knows from the mapping in table 412 which resource in the PUSCH contains Msg 3, based on which preamble is received by the base station 170 in step 358 of FIG. 7. For example, if the base station 170 receives preamble 2, then the base station 170 knows that corresponding Msg 3 is to be received on the PUSCH as per the granted resource indexed as Resource 2. The base station 170 knows to receive Msg 3 at time-frequency location 'A2' in the PUSCH.

Figure 9:
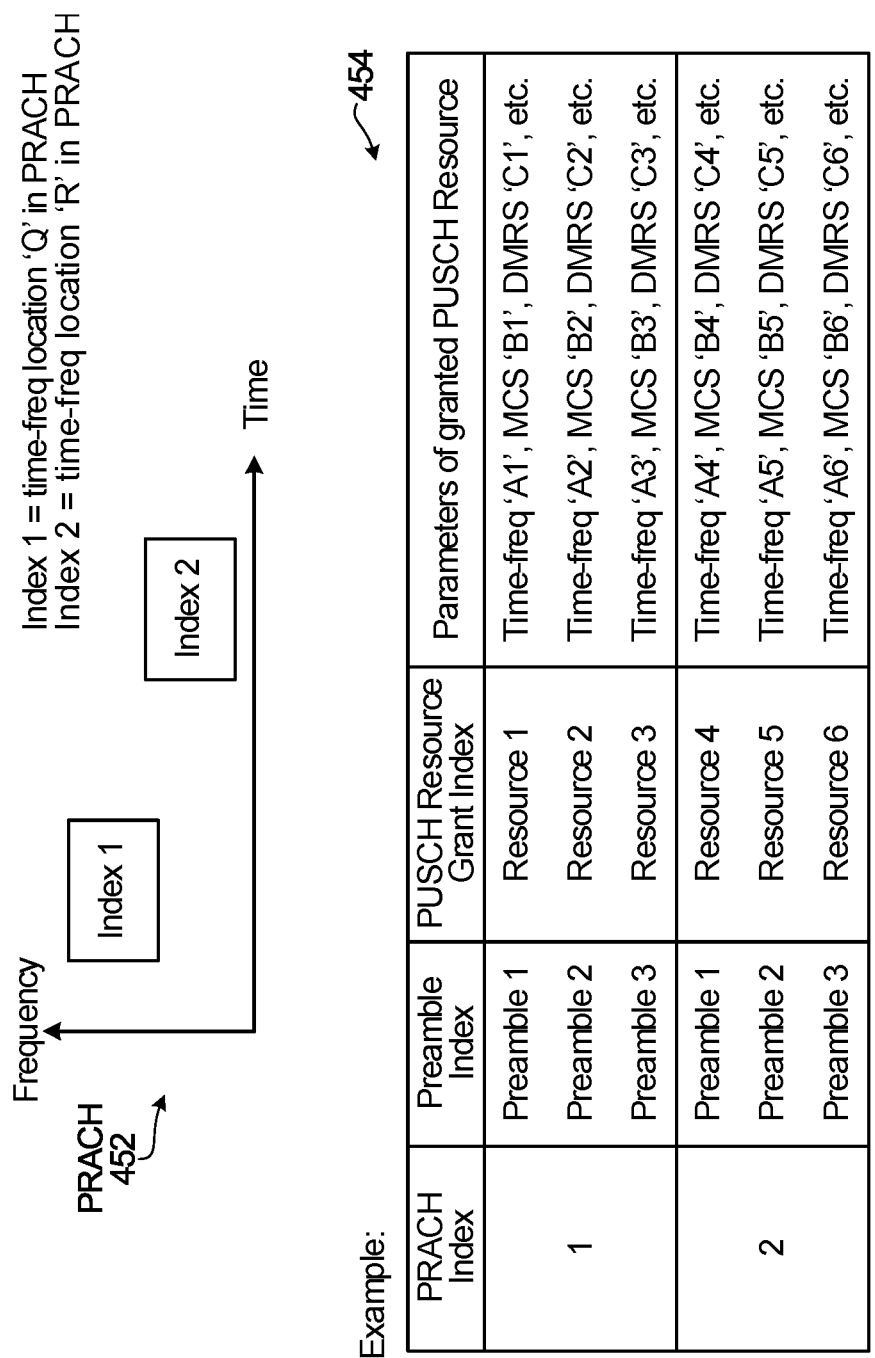
FIG. 9 illustrates a PRACH, according to one embodiment.

In some embodiments, the mapping between each preamble and a corresponding uplink data channel resource grant also depends on the transmission resources (e.g. time-frequency location) on which the preamble is transmitted in the random access channel. For example, FIC. 9 illustrates a PRACH 452, according to one embodiment. Preambles 1 to 3 may be transmitted at time-frequency location 'Q' in the PRACH or at time-frequency location 'R' in the PRACH. Time-frequency location 'Q' is indexed as PRACH Index 1, and time-frequency location 'R' is indexed as PRACH Index 2. At time-frequency resource 408 of each PBCH block in FIG. 8, the base station 170 transmits table 454 of FIG. 9 or a message containing the information of the table 454. In table 454, the PUSCH resource grant is based on both: (1) the PRACH Index, i.e., whether the preamble was transmitted at time-frequency location 'Q' or 'R' in the PRACH; and (2) the preamble actually transmitted, which is identified by the preamble index. For example, if the UE 110 transmits preamble 1 on the PRACH time-frequency resource indexed as PRACH Index 1, then the UE 110 uses the PUSCH resource grant indexed as Resource 1 to transmit Msg 3. If the UE 110 instead transmits preamble 1 on the PRACH time-frequency resource indexed as PRACH Index 2, then the UE 110 uses the PUSCH resource grant indexed as Resource 4 to transmit Msg 3.

In some embodiments, some of the transmission parameters specified in the resource grants may be the same value, e.g. MCS 'B1'=MCS 'B2'=MCS 'B3'='B'.

In some embodiments, the last (right-hand) column of table 412 and/or table 454, which specifies the parameters of the resource grants, may be omitted to save overhead, e.g. if the parameters of each PUSCH resource grant are preconfigured in advance.

In some embodiments, the last (right-hand) column of table 412 and/or table 454 is present, but not all of the transmission parameters are indicated. The transmission parameters not indicated in the table may be preconfigured in advance, e.g. set to default values. In one example, the time-frequency location for each resource grant is indicated in tables 412 and 454 ('A1', 'A2', 'A3' etc.), but the other transmission parameters are only optionally indicated. For example, the MCS and DMRS may be omitted and instead are preconfigured as a set value, e.g. MCS 'B1'=MCS 'B2'= . . . =MCS 'B6'='B', and'B' is a default MCS value set in advance. More generally, in some embodiments, some or all of the transmission parameters of the resource grants are preconfigured, e.g. set as default values known in advance, instead of being transmitted in the broadcast channel. For example, some or all of the PUSCH resource grant information sent at time-frequency location 408 of the PBCH in FIG. 8 may instead not be sent at time-frequency location 408, but may be preconfigured in advance and known by both the base station 170 and the UE 110.

In some embodiments, there is a predefined association between: (1) a resource grant, and (2) a preamble and/or a random access channel transmission resource, and therefore not all of tables 412 and 454 need to be transmitted. For example, it may be preconfigured in advance and known by both the base station 170 and the UE 110 that a preamble transmission on PRACH Index 2 is associated with one of the Resources 4-6, in which case table 454 does not have to explicitly indicate that PRACH Index 2 is associated with Resource 4 to Resource 6.

In some embodiments, the set of resource grants are multicast to UEs capable of performing the two-step random access procedure. For example, both UEs capable of performing the two-step random access procedure and UEs capable of only performing the four-step random access procedure are able to locate and decode the random access channel configuration information for four-step random access procedure, e.g. sent at time-frequency location 404 of the PBCH of FIG. 8. However, the UEs capable of performing the two-step random access procedure are additionally able to locate and decode the random access channel configuration information for two-step random access procedure, sent at time-frequency location 404 (or a different time-frequency location) of the PBCH of FIG. 8. Accordingly, in some embodiments both UEs capable of performing the two-step random access procedure and UEs capable of only performing the four-step random access procedure are able to locate and decode the configuration of the set of resources for Msg 3 and the association with the four-step random access procedure, sent at, e.g., time-frequency location 408 of the PBCH; whereas the UEs capable of performing the two-step random access procedure are additionally able to locate and decode the configuration of the set of resources for Msg 3 and the association with the two-step random access procedure, sent at, e.g., time-frequency location 408 (or a different time-frequency location) of the PBCH.

In some embodiments, the set of resource grants are transmitted in higher-layer signaling instead of in a broadcast channel. For example, the PUSCH resource grant information sent at time-frequency location 408 of the PBCH in FIG. 8 may instead not be sent at time-frequency location 408 of the PBCH, but is transmitted in higher-layer signaling. An example of higher-layer signaling is an RRC configuration message. Another example of higher-layer signaling is a multi-cast signaling configuration to one or more UEs, optionally using a UE group ID.

Figure 10:
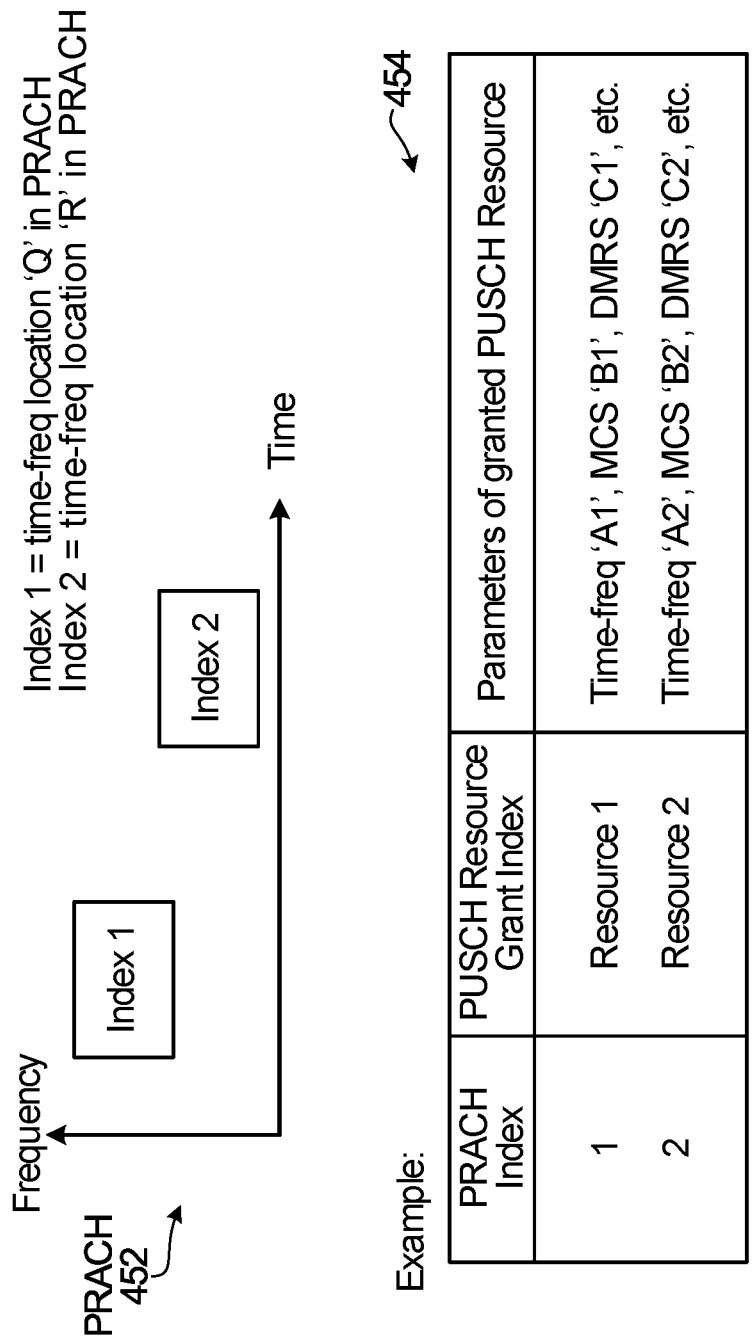
FIG. 10 illustrates a variation of FIG. 9 in which there is a mapping between PRACH resources and a PUSCH resource grant.

In some embodiments, there is an association between: (1) transmission resource (or transmission opportunity), e.g. time-frequency location, on which a preamble is transmitted in the random access procedure, and (2) a resource grant used to send uplink data, e.g. Msg 3, on an uplink data channel. For example, FIG. 10 illustrates a variation of FIG. 9 in which table 454 instead provides a one-to-one mapping between PRACH Index and PUSCH resource grant. If a preamble is transmitted on time-frequency location 'Q' in the PRACH, i.e. PRACH Index 1, then Resource 1 is used for the PUSCH data transmission. If the preamble is transmitted on time-frequency location 'R' in the PRACH, i.e. PRACH Index 2, then Resource 2 is used for the PUSCH data transmission. It does not matter the actual preamble sent.

In the embodiments described above in relation to FIGS. 8 to 10, a one-to-one mapping is provided. For example, in table 412 of FIG. 8, there is a one-to-one mapping between preamble selected and PUSCH transmission resource. In table 454 of FIG. 9, there is a one-to-one mapping between (1) preamble selected and PRACH transmission resource, and (2) PUSCH transmission resource. In alternative embodiments, the mapping does not have to be one-to-one. For example, there may be a multiple-to-one mapping. FIG. 11 illustrates two examples of a multiple-to-one mapping for uplink channel resources. In Example 1 of FIG. 11, two different preambles (Preamble 1 and Preamble 2) map to the same PUSCH resource (Resource 1). In Example 2 of FIG. 11, two different PRACH resources (PRACH Index 1 and PRACH Index 2) map to the same set of PUSCH resources (Resource 1 to Resource 3).

In some other embodiments, there may be a one-to-multiple mapping. FIG. 12 illustrates two examples of a one-to-multiple mapping for uplink data channel resources. In Example 1 of FIG. 12, Preamble 1 is mapped to two possible PUSCH resources, either of which may be used by UE 110 when Preamble 1 is transmitted on the PRACH. In Example 2 of FIG. 12, two PUSCH resources are associated with each preamble transmitted on the PRACH resource PRACH Index 1. When a preamble is transmitted on PRACH index 1, then the UE 110 has two possible PUSCH resources that may be used. In some embodiments, a multiple-to-multiple mapping may be used, e.g. a combination of the examples in FIGS. 11 and 12. In some embodiments, the mapping may be implemented by performing mapping between an index of a preamble (or the preamble channel allocation) and an index (or indices) of uplink data channel resource(s) or resource set(s); or by performing mapping between indices of the preambles (or the preamble channel allocations) and an index of uplink data channel resource(s) or resource set(s). The mapping can be configured/preconfigured by signaling such as RRC, MAC CE, or predefined in a UE specific, UE group based or cell based manner. In other embodiments, there can be time or/and frequency associations between the random access channel locations for transmitting the random access preambles and the uplink data channel resource locations for transmitting uplink traffic; moreover, in some embodiments relative time or/and frequency locations between the random access channels and the uplink data channel resources can be preconfigured or predefined by RRC, MAC CE, and/or other higher-layer signaling.

Whenever the mapping is not one-to-one, a mechanism may be needed to resolve possible conflicts. For example, when Preamble 1 is transmitted in Example 1 of FIG. 12, the base station 170 may need to search for the corresponding PUSCH transmission in two locations (time-frequency location 'A1' and 'A2'), and resolve any conflict if there happens to be a PUSCH transmission present at both locations, e.g. a type of blind detection or the like. In other embodiments, the UE 110 can choose one from the multiple PUSCH resources for the uplink data (e.g., Msg 3) transmission. In some embodiments, the choice of one PUSCH resource at a time interval (e.g., slot) can be based on the UE 110's traffic type such as eMBB, mMTC or URLLC; or required quality of service such as latency or reliability demand. The PUSCH resource selection information can also be transmitted to the base station (along with the data transmission) in the form of uplink control information (UCI) using, e.g., a physical uplink control channel (PUCCH). Alternatively, the PUSCH resource selection can be indicated explicitly by the base station, for example, using DC in a physical downlink control channel (PDCCH).

In some embodiments, the mapping between the preamble and the granted uplink data channel resource may be implicit and may be predefined. For example, it may be predefined or configured that the first three values in the preamble sequence indicate the PUSCH resource grant.

Any of the possible configurations described above may be indicated by the base station 170 when the base station 170 also indicates the usable preambles. An example is FIG. 8 in which the base station broadcasts both the PRACH configuration information at time-frequency resource 404 and the PUSCH resource grants at time-frequency location 408. Alternatively, some of the configurations may be indicated by the base station 170 separate from when the base station 170 indicates the usable preambles. An example is a variation of FIG. 8 in which some or all of the information transmitted on time-frequency resource 408 is instead not transmitted on time-frequency resource 408, but is transmitted in higher layer signaling or otherwise predetermined in advance and known by both the UE 110 and the base station 170.

Example Scenario 2—UE is in a RRC Connected State:

There may be situations in which the two-step random access procedure is to be performed when the UE 110 is already in an RRC connected state, e.g. if the TA value the UE 110 is using is no longer valid and resynchronization is needed.

In some embodiments, when the UE 110 is in the RRC connected state, higher-layer signaling, such as an RRC configuration message, may be used in step 352 of FIG. 7 to transmit to the UE 110 both a specific preamble and an associated uplink data channel resource grant. Then, when the UE 110 is to initiate the two-step random access procedure, in step 356 of FIG. 7 the UE 110 transmits the specific assigned preamble on the random access channel and transmits Msg 3 on the associated configured uplink data channel resource. When the base station 170 receives the preamble on the random access channel, the base station 170 knows that the preamble belongs to UE 110 and knows the uplink data channel resource on which to receive Msg 3 because the base station 170 assigned the preamble and uplink data channel resource to UE 110. In one embodiment, the specific preamble assigned to UE 110 is unique to UE 110 on the random access time-frequency resources on which the UE 110 may transmit the preamble with contention-free random access.

Variations are possible, including the following:

(1) In some embodiments, the UE 110 is assigned a specific set of resources on the random access channel, e.g. a particular PRACH Index that corresponds to a preconfigured periodic set of time-frequency resources on the PRACH. If a preamble is received by the base station 170 on any of the time-frequency resources associated with the PRACH Index, then the base station 170 knows that the transmission is or may be from UE 110.

(2) In some embodiments, the UE 110 is assigned a specific set of resources on the random access channel, e.g. a particular PRACH Index that corresponds to a preconfigured periodic set of time-frequency resources on the PRACH. The UE 110 is also assigned a specific preamble. If the specific preamble is received by the base station 170 on any of the time-frequency resources associated with the PRACH Index, then the base station 170 knows that the transmission is from UE 110.

(3) In some embodiments, the specific uplink data channel resource granted to UE 110 is a set of grant-free resources, e.g. a set of periodic time-frequency locations in the uplink data channel, any of which may be used to transmit Msg 3.

The grant-free (GF) resources may be type 1 or type 2. Type 1 GF means that the basic Msg 3 transmission resources and parameters will be configured by an RRC signaling message, and an indication in DCI is not needed to activate the grant-free resources, i.e. an indication in DCI is not needed to allow the UE 110 to transmit data on the grant-free resources upon traffic arrival. Type 2 GF means that an indication in DCI is needed to activate the grant-free resources before initial data transmissions.

(4) In some embodiments, only one or some of the following are changed by the base station 170 during a particular period of time: the specific preamble assigned to the UE 110; the specific random access channel resources assigned to the UE 110; the specific uplink data channel resource granted to UE 110. The base station 170 may indicate the change using higher-layer signaling, such as in an RRC configuration message, or resource re-configuration.

In one example, a UE 110 in an RRC connected state receives the following information from the base station 170, which may be received in an RRC configuration message sent in step 352 of the two-step random access procedure in FIG. 7:

(1) An indication of which preamble to use, e.g. Preamble 1;
(2) An indication of resources in the random access channel that the UE 110 is able to use to transmit the preamble, e.g. PRACH Index 1 corresponding to a preconfigured periodic set of time-frequency resources on the PRACH;
(3) An indication of the resource granted in the uplink data channel for sending Msg 3, e.g. Index 3 type 1 grant-free resources; Index 3 is a preconfigured periodic pattern of grant-free resources in the PUSCH.

In some embodiments, a contention-based two-step random access procedure may be performed by UEs in an RRC connected state, e.g. if the same preamble may possibly be used by different UEs on the same time-frequency resources of the random access channel. In one example, each UE of a group of UEs in RRC connected state receives a respective RRC configuration message. The RRC configuration message provides the following information:

(1) A group ID, which is an identifier of a group of UEs in an RRC connected state that have the capability to perform a two-step random access procedure.
(2) An indication of a set of preambles that may be used by the UEs, e.g. Preambles 1 to 3;
(3) An indication of resources in the random access channel that the UEs are entitled to use to transmit a preamble, e.g. PRACH Index 1 corresponding to a preconfigured periodic set of time-frequency resources on the PRACH.
(4) An indication of resources configured in the uplink data channel for sending Msg 3, e.g. an indication of Index 3 type 1 grant-free resources. Index 3 is a preconfigured periodic pattern of grant-free resources in the PUSCH. In a variation, the grant-free resources may be type 2 instead. In one example, a configured PUSCH resource includes the following parameters: a resource index including a frequency hopping flag; a time-frequency resource allocation; DMRS; MCS; TPC; CSI; and optionally configuration on two-step and/or four-step transmission procedure on demand. Moreover, the (pre-)configured transmission resources can be overlapping or non-overlapping, each with a resource index. For example, the time-frequency resource portions can be interlaced in frequency, time, and/or time-frequency domain for non-overlapping resources.
(5) A mapping between (i) each preamble and/or resource in the random access channel, and (ii) a configured resource in the uplink data channel for sending Msg 3, e.g. like tables 412 and 454 described earlier. In one example, each preamble index is associated with an index identifying the resource or uplink data channel configured for sending Msg 3.

The RRC configuration message indicating (1) to (5) immediately above is transmitted by the base station 170 to UE 110 in step 352 of FIG. 7. The configuration indicating (1) to (5) immediately above is also transmitted by the base station 170 to any of the other UEs in the group in separate respective RRC configuration messages. UE 110 and any other UE in the group then performs the two-step random access procedure as necessary and according to steps 354 to 368 of FIG. 7. The RRC configuration above with the group ID is for multiple UEs to share the set of configured preambles on a contention basis. Once a UE selects (randomly, or based on pre-defined/preconfigure rule/mapping) one preamble sequence for use in a Msg 1 transmission, the UE's PUSCH resource for sending Msg 3 may or may not overlap with other resources depending on the PUSCH (Msg 3) resource configurations. In some embodiments, the RRC configuration (1) above is a UE specific RNTI such as CS-RNTI instead of a group ID, in which case the RRC configuration on other parameters will be UE specific, the other parameters including: the preamble(s) used, random access channel(s) for preamble transmission(s), Msg 3 transmission resource (s), and the associated mapping between preamble transmission(s) and Msg 3 transmission resource(s).

Fallback to a Four-Step Random Access Procedure

There may be situations in which a two-step random access procedure is attempted, but it becomes necessary or desirable to switch to a four-step random access procedure.

Figure 13:
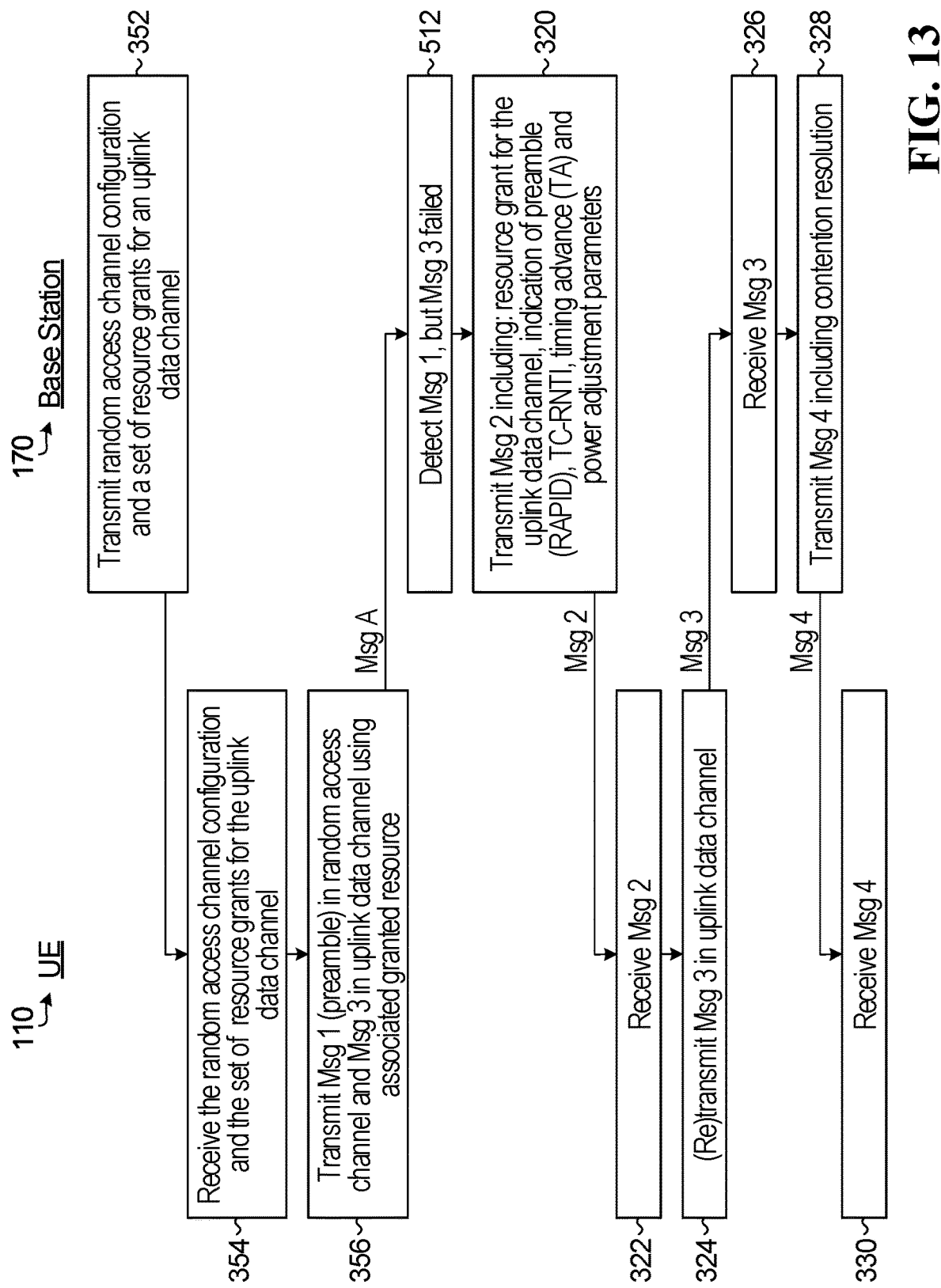
FIGS. 13 to 15 are flowcharts illustrating methods of switching from a two-step random access procedure to a four-step random access procedure, according to various embodiments.

FIG. 13 is a flowchart illustrating a method of switching from a two-step random access procedure to a four-step random access procedure, according to one embodiment. Steps 352 to 356 are the same as those illustrated and described in relation to FIG. 7. In step 512, only Msg 1 (including the preamble) is successfully detected by the base station 170. Msg 3 is not successfully decoded, e.g. perhaps because of a change in channel condition or channel quality. In this case, Msg B from the base station may include only Msg 2, which is shown in Step 320 of FIG. 13; however, the UE 110 with the two-step access procedure expects Msg B to include more information than Msg 2. Once the UE has determined the Msg B to be only an Msg 2 message, the UE may realize the possible failure situation, and in this case will follow the four-step random access procedure. Therefore, steps 320 to 330 of the four-step random access procedure of FIG. 6 are performed. For example, in step 320 Msg 2 described in relation to FIG. 6 is transmitted from the base station 170 to the UE 110. Msg 2 includes a resource grant for the uplink data channel. The resource grant is used by the UE 110 in step 324 to retransmit Msg 3 to the base station 170. The transmission of Msg 3 in step 324 uses the TA and power adjustment parameters provided by the base station 170 in Msg 2. In response to successful detection and decoding of Msg 3 in step 326, the base station 170 transmits Msg 4 to UE 110 in step 328.

In some embodiments, the presence of the uplink data channel resource grant in the message transmitted by the base station in step 320, and/or the absence of Msg 4 in the message transmitted by the base station in step 320, indicates to the UE 110 that the two-step random access procedure has switched to the four-step random access procedure. In other embodiments, the message transmitted by the base station 170 in step 320 explicitly indicates whether or not the two-step random access procedure has switched to the four-step random access procedure. For example, the message transmitted by the base station 170 in step 320 may include a control field that indicates to the UE 110 that Msg 2 is transmitted and Msg 4 is not transmitted, and that the two-step random access procedure has switched (or performed fall-back) to the four-step random access procedure. The control field may be present as part of a medium access control (MAC) information format or MAC control element (CE). If Msg 3 was instead successfully decoded by the base station 170 at step 512, then a normal response Msg B would be transmitted by the base station 170. As a result, to distinguish the failure and normal response for Msg B, more than one message format can be used, e.g., one format to include the Msg 2 and Msg 4, and another format to include only Msg 2 (due to failure detection on Msg 3). In other embodiments, Msg B response contents are transmitted in a PDSCH and the PDSCH transmission channel is scheduled by PDCCH signaling in a DL DCI with CRC scrambled by RA-RNTI, and therefore a control field in the DCI can be used for indicating whether the Msg A has been decoded correctly or of detection failure; also, the control field can include more control information such as: which (two-step or four-step) random access procedure is activated/active; continuing to retry the two-step random access procedure; switching the two-step to the four-step random access procedure; and optionally, timer values for two-step and/or four-step random access procedure(s), power control, maximum retransmission number for a random access process, MCS update, etc.

Figure 14:
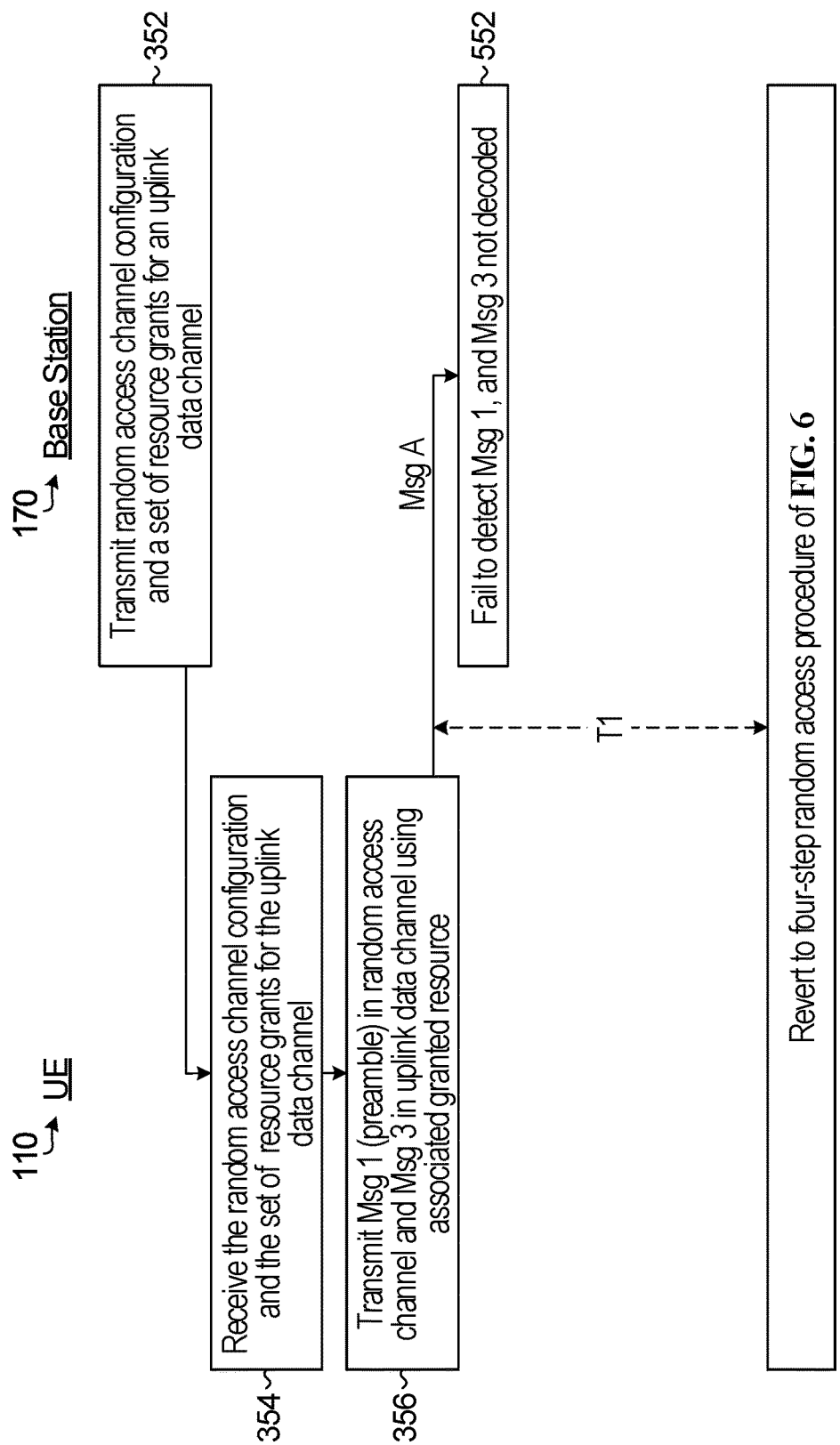

FIG. 14 is a flowchart illustrating a method of switching from a two-step random access procedure to a four-step random access procedure, according to another embodiment. Steps 352 to 356 are the same as those illustrated and described in relation to FIG. 7. In step 552, the base station 170 fails to detect Msg 1 (the preamble) and so Msg 3 is also not decoded. The base station 170 therefore sends no response. The UE 110 waits for a response from the base station 170 for the predetermined duration of time T1. If no response is received upon expiry of the duration of time T1, then the UE 110 performs the four-step random access procedure of FIG. 6, starting from Msg 1, possibly with the same preamble or with a different preamble from that transmitted in step 356 in FIG. 14. In some embodiments, the duration of time T1 corresponds to a reception time window during which Msg B may be received. In a variation of FIG. 14, the base station 170 detects Msg 1 in step 552 and possibly also successfully decodes Msg 3, but the response transmitted from the base station 170, e.g. Msg B, is not successfully decoded by UE 110. The duration of time T1 therefore expires, and the UE 110 performs the four-step random access procedure of FIG. 6.

FIC. 15 is a variation of FIG. 14 in which retransmission of Msg 1 and Msg 3 is performed before switching to the four-step random access procedure. In step 552, the base station 170 fails to detect Msg 1 and so Msg 3 is also not decoded. The base station 170 therefore sends no response. The UE 110 waits for a response from the base station 170 for the predetermined duration of time T2. If no response is received upon expiry of the duration of time T2, then in step 554 the UE 110 retransmits Msg 1 and Msg 3 (which is Msg A). The retransmission in step 554 may be performed with a higher power than the transmission in step 356. In the example in FIG. 15, in step 556 the base station 170 still fails to detect Msg 1 and so Msg 3 is also still not decoded. This may lead to another retransmission of Msg A upon expiry of another duration of time T2. The retransmissions of the Msg A in the two-step random access procedure continue until the expiry of a predetermined duration of time T3 from the first transmission of the Msg 1 with the two-step random access procedure; then the UE 110 performs/switches to the four-step random access procedure of FIG. 6, possibly with the same preamble or with a different preamble from that transmitted in step 356 of FIG. 15. In some embodiments T3=T1.

More generally, if a response from the base station 170 is not received within a predetermined time after the UE 110 transmits Msg 1 and Msg 3, then the UE 110 may perform one or multiple retransmission attempts of Msg 1 and Msg 3 (that is Msg A). Retransmission attempts of Msg A may be performed until expiry of the duration of time T3, or until the maximum number of retransmission attempts has been performed. The duration of time between retransmission attempts may be T2. The duration of time T2 may correspond to a reception time window during which Msg B may be received. The number of retransmission attempts and/or duration of time T2 between retransmission attempts may be configurable. Power ramping may be used for the retransmissions, for example: the initial transmission of Msg 1 and/or Msg 3 may be performed by the UE 110 using a first transmission power; the first retransmission of Msg 1 and/or Msg 3 may be performed using a second transmission power; the second retransmission of Msg 1 and/or Msg 3 may be performed using a third transmission power, etc.; the third transmission power is greater than or equal to the second transmission power; the second transmission power is greater than or equal to the first transmission power. In other embodiments, for one of the retransmissions of Msg A, the Msg 1 portion may be correctly detected and decoded, but the Msg 3 is decoded incorrectly, like in Step 512 in FIG. 13; in this case, the two-step random access procedure will switch to the four-step random access procedure, following the scheme described in FIG. 13.

Figure 15:
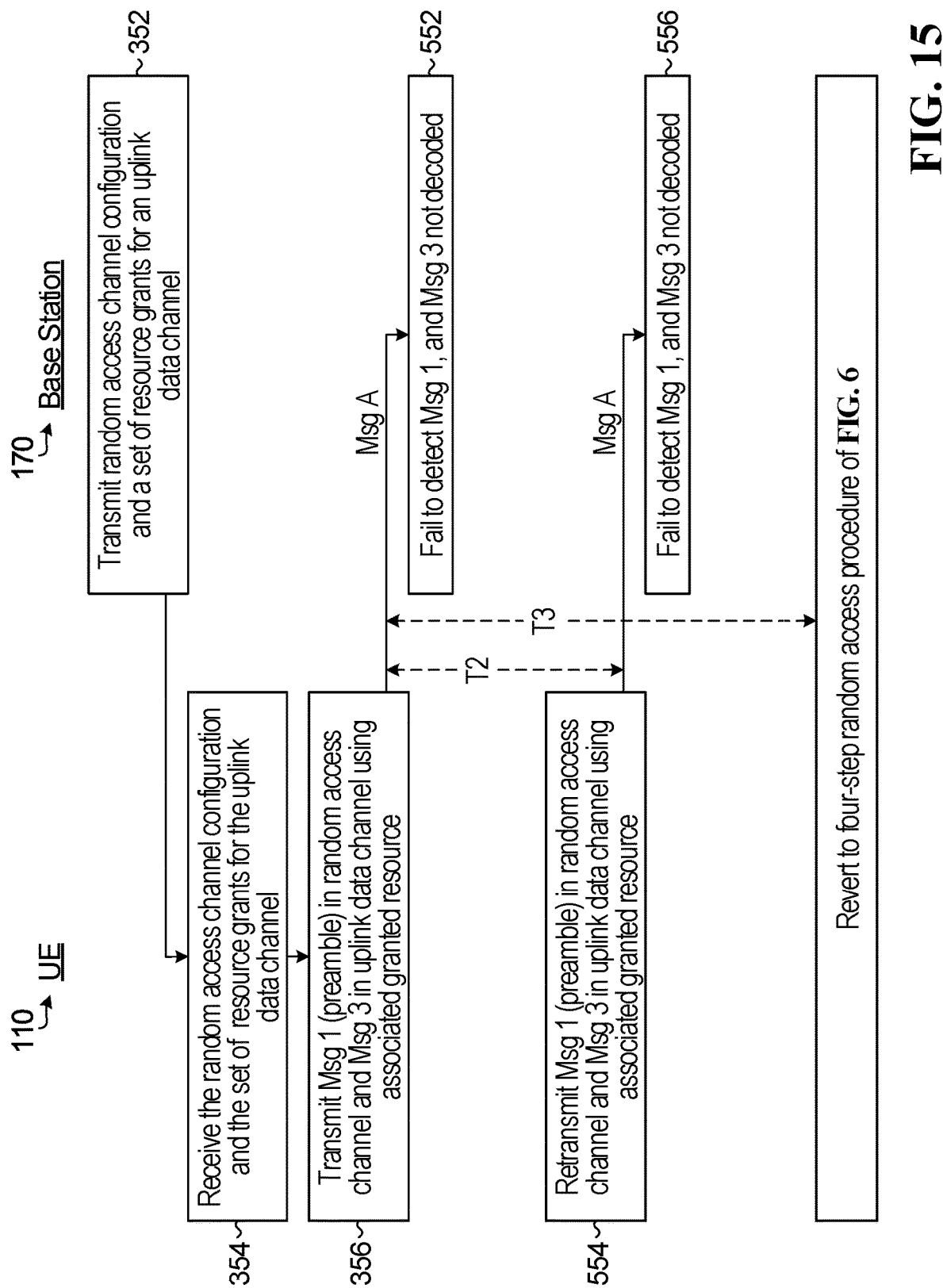

The ability to perform the methods of FIGS. 13 to 15 may allow for the base station 170 and UE 110 to accommodate and react to different reception scenarios.

Division of Resources Between Four-Step and Two-Step Random Access

Prior to an initial transmission by a UE, and/or prior to UE capability reporting, the base station 170 has no knowledge of whether a particular UE will perform a two-step random access procedure or a four-step random access procedure. A UE having the capability to perform a two-step random access procedure may automatically try to perform a two-step random access procedure, whereas a UE having only the capability to perform a four-step random access procedure will just perform a four-step random access procedure. Therefore, in some embodiments, both two-step random access channel resources and four-step random access channel resources are allocated. If a UE uses two-step random access channel resources, then the base station 170 knows that the UE is initiating a two-step random access procedure. If a UE uses four-step random access channel resources, then the base station 170 knows that the UE is initiating a four-step random access procedure. The following is a non-exhaustive list of examples of how both two-step random access channel resources and four-step random access channel resources may be allocated:

(1) In one example, two mutually exclusive sets of random access preambles are used: one set for use by UEs performing a two-step random access procedure, and the other set for use by UEs performing a four-step random access procedure, where the configured random access channels are shared by all these UEs performing random access procedures. For example, preambles 1 to 4 are used by UEs performing a two-step random access procedure, and preambles 5 to 8 are used by UEs performing a four-step random access procedure. Therefore, when a preamble is received by the base station 170 on a random access channel, the base station 170 knows from the identity of the preamble whether a two-step random access procedure is being initiated or whether a four-step random access procedure is being initiated. In an example, the base station 170 knows from the receipt of preamble 2 that a two-step random access procedure is being initiated and the base station 170 knows to look for Msg 3 on time-frequency location 'A2' of the uplink data channel because of a known association between preamble identity 2 and an uplink data channel resource. Each random access occasion/opportunity on the random access channel may be used for the two-step random access and/or the four-step random access because the preambles distinguish between two-step and four-step.

(2) In another example, different random access channel time-frequency resources may be used to distinguish between two-step random access and four-step random access. The preambles used are the same for both two-step and four-step random access, but the time-frequency resources on which a preamble is transmitted indicate to the base station 170 whether a two-step random access procedure is being initiated or whether a four-step random access procedure is being initiated. For example, two-step random access channel resources and four-step random access channel resources may be configured to be separate from each other using time-division or frequency-division. In one example, time-division multiplexing (TDM) or frequency-division multiplexing (FDM) may be used to distinguish between random access channel time-frequency resources used for two-step random access and random access channel time-frequency resources used for four-step random access.

In some embodiments, the network may configure whether two mutually exclusive sets of random access preambles are used to distinguish between two-step and four-step random access, or whether different random access channel time-frequency resources are used to distinguish between two-step and four-step random access. The random access channel resources specifically allocated to two-step and four-step random access may be configured by the network. Random access channel resources may also be configured for retrying a failed two-step random access and for switching from a two-step to a four step random access procedure, e.g. as per FIGS. 14 to 15 described above.

Some Example Application Cases

Example case 1—Handover (HO) or beam-switching with grant-based transmission: One of the requirements on data transmission during HO/beam switching is to achieve as short as possible transmission disruption (or even no disruption at all) during the HO/beam switching. Intra-cell beam switching may not need a TA timing adjustment (or no random access procedure) during switching/HO procedure because the beams are co-located, and so the beam switching/HO performance may be acceptable. It may be more challenging for (not co-located) inter-cell beam switching/HO. A relevant question is: how to make the inter-cell HO/beam switching performance equivalent to that of intra-cell beam switching? If an inter-cell HO/beam switching process is involved in a random access process as needed, then latency will occur anyway (even with dedicated preamble access in the four-step transmission procedure). For example, during one (especially inter-cell) HO/beam switching in a current network, a UE reports its downlink (DL) measurements (including the neighboring base station reference signals) to a serving base station, and the serving base station may initiate a HO/beam switching process by sending a HO request to one or more target base stations; then the target base station(s) will send a HO response if the HO/beam switching is allowed. The target base station(s) will configure the required resources and reserve a C-RNTI and a random access (e.g. RACH) preamble/preamble access channel, and then the serving base station will deliver the HO resource configuration(s) from the target base station(s) to the UE via a HO command (or RRC reconfiguration message). To try to minimize the HO/beam switching time for a UE, the two-step random access procedure may be applied in which the HO command may include a RRC configuration for the UE on the two-step random access procedure as described in Step 352 of FIG. 7 for the UE to apply with one or more target base stations. The configuration may include the information indicating a UE specific preamble (or index), a preamble transmission channel (that can be a dedicated channel or a shared channel with any other UE), an uplink grant resource for Msg 3 transmission (that can be a dedicated resource or a shared resource with any other UE). In this case, the transmission during the UE HO or beam switching may be of no disruption or may be seamless because the data transmission will go along with the preamble transmission. After the two-step transmission procedure, the base station may provide more specific control information in Msg B, such as a TA value, power adjustment parameter(s), etc. Therefore, the transmissions immediately following the two-step transmission procedure during the HO/beam-switching will not need any more preamble transmission because the uplink timing can be suitably synchronized after the timing adjustment based on the TA value in the Msg B.

Example case 2—HO or beam-switching with GF transmissions: In example case 1 above, if GF transmission on Msg 3 is supported, then the HO command to the UE from the serving base station during the HO/beam switching procedure will include the configuration on the two-step random access procedure for the GF UE for one or more target base stations. The configuration includes: the information indicating UE specific preamble (or index) or shared preamble set, preamble transmission channel (that can be a dedicated channel or a shared channel with any other UE), a set of uplink (UL) pre-granted resources for Msg 3/data transmissions (that can be a dedicated resource or a shared resource with any other UE), as well as an association between a preamble with one transmission opportunity and one resource from the set of configured resources for Msg 3 transmission. In this case, the transmission during the HO or beam switching may be of no disruption or may be seamless because the GF data transmission will go along with the preamble transmission. After the two-step transmission process, the base station will provide more specific control information in Msg B, such as a TA value, power adjustment parameter(s), etc. Therefore, the GF transmissions immediately following the two-step transmission procedure during the HO/beam-switching will not need any more preamble transmission because the uplink timing can be suitably synchronized after the timing adjustment based on the TA value in the Msg B.

Note that during the HO or beam switching process with the two-step random access process, the configurations for either or both of grant-based and GF transmission can be made. The configuration signaling can be via a HO command message or can be another control message, such as broadcast signaling.

Example case 3—GF transmissions with the two-step transmission procedure: For a UE with GF transmissions, the UE specific resource configuration (such as new radio (NR) configured grant Type 1 or Type 2) has been configured already in RRC connected state. To support asynchronous data transmission on demand in case of out-of-UL-synchronization due to UE mobility, connection or beam failure, a TA timer-out, etc., the base station can configure, via higher-layer signaling such as RRC, one random access channel resource that is associated with one GF resource (for each of the GF resources), such that the two-step random access procedure can be performed on demand for one uplink timing synchronization. The GF data transmission can be performed only without any preamble transmission because the uplink timing can be suitably synchronized after the timing adjustment based on the TA value in the Msg B. Some or all of the configuration parameters, such as the preamble and random access channels and/or GF resources configured in the connected state for the two-state transmission/random access procedure, can be maintained when the UE transitions to inactive state or idle state. A two-step random access procedure may be used once (for a while) on demand for an uplink timing synchronization during the normal data transmissions (i.e., without any preamble transmission) in a connected, inactive or idle state. Note that the two-step random access procedure can be considered a normal uplink data transmission with an overhead uplink transmission of a preamble in order for the base station to measure the uplink timing and send a TA value to the UE for uplink timing synchronization. The overhead uplink transmission of a preamble can be generally considered as an additional transmission of a certain uplink reference signal that is more specifically designed for timing measurement by the base station, on top of the functionality such as channel estimation, UE identification, resource/channel identification, etc.

According to some embodiments, in an inactive state or idle state, the two-step random access process can be used for an uplink data transmission while transitioning to connected state, where the transmitted data will include both UE data and some control information, such as a request to the base station for the state transition from inactive state or idle state to the connected state, and/or UE identity. Alternatively, the transmitted data will include no UE data but only the control information, such as a request to the base station for the state transition from inactive state or idle state to the connected state, and/or UE identity.

Example Methods

Figure 16:
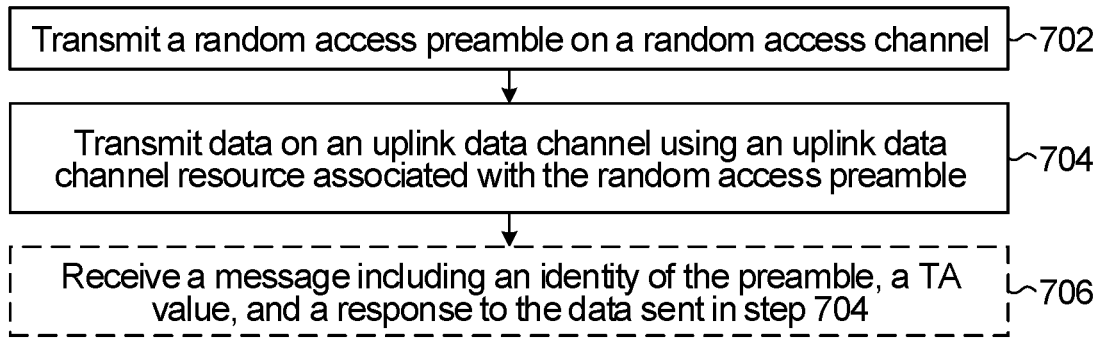

FIG. 16 is a flowchart of a method performed by UE 110, according to one embodiment. In step 702, the UE 110 transmits a random access preamble to the base station 170 on a random access channel. In step 704, the UE 110 transmits data to the base station 170 on an uplink data channel using a particular uplink data channel resource. The particular uplink data channel resource is associated with the random access preamble and/or the random access channel, e.g. by a mapping. For example, the particular uplink data channel resource may be selected by the UE based on the identity of the random access preamble.

Optionally, in step 706, the UE 110 receives a message from the base station 170 that includes: an identity of the random access preamble, a TA value, and a response to the data that was transmitted on the uplink data channel in step 704.

At least tables 412 and 454 described earlier illustrate examples of an association between a random access preamble (and/or random access channel) and a particular uplink data channel resource, e.g. preamble 1 in table 412 is associated with resource 1. An example of steps 702 and 704 is step 356 of FIG. 7. The data sent in step 704 of FIG. 16 may be or include Msg 3.

Figure 17:
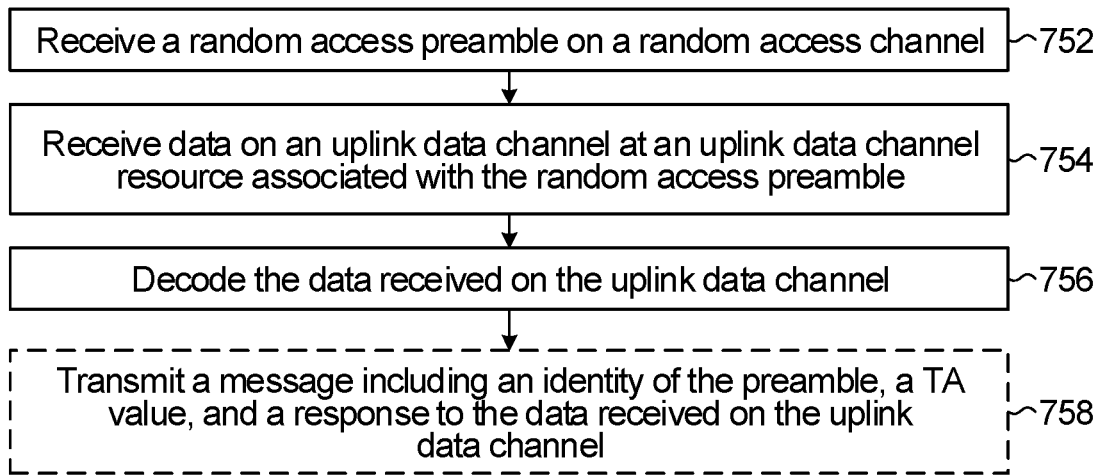
FIG. 17 is a flowchart of a method performed by a base station, according to one embodiment.

FIG. 17 is a flowchart of a method performed by base station 170, according to one embodiment. In step 752, the base station 170 receives a random access preamble from UE 110 on a random access channel. The preamble can be detected and may be used for functions such as: uplink timing measurement, and/or UE identification, and/or channel estimation, etc. In step 754, the base station 170 also receives, from the UE 110, data on an uplink data channel at a particular uplink data channel resource. The particular uplink data channel resource is associated with the random access preamble and/or random access channel. In step 756 the base station 170 decodes the data received at step 754. Optionally, at step 758, the base station 170 transmits to the UE 110 a message including: an identity of the random access preamble received on the random access channel, a TA value, and a response to the data that was received on the uplink data channel.

An example of steps 752 and 754 is step 358 of FIG. 7. An example of the data received in step 754 is Msg 3. An example of the message transmitted at step 758 is Msg B. The response to the received uplink data may be or include Msg 4.

EXAMPLES

In view of, and in addition to the above, the following examples are disclosed.

Example 1: A method performed by a UE, the method comprising: transmitting a random access preamble on a random access channel; and transmitting data on an uplink data channel using a particular uplink data channel resource; wherein the particular uplink data channel resource is associated with the random access preamble.

Example 2: The method of Example 1, wherein the particular uplink data channel resource is selected by the UE based on the random access preamble and/or the random access channel.

Example 3: The method of Example 1 or Example 2, wherein the particular uplink data channel resource is selected by the UE based on an identity of the random access preamble.

Example 4: The method of any one of Examples 1 to 3, wherein there is a one-to-one mapping between the particular uplink data channel resource and the random access preamble.

Example 5: The method of any one of Examples 1 to 4, wherein the random access preamble is selected from a set of random access preambles, and wherein each random access preamble in the set of random access preambles is associated with a respective uplink data channel resource.

Example 6: The method of Example 5, wherein each random access preamble in the set of random access preambles is associated with a different uplink data channel resource.

Example 7: The method of Example 5 or Example 6, further comprising receiving, from a base station: an indication of the set of random access preambles; and an indication of the association between: (i) each random access preamble in the set of random access preambles and (ii) the respective uplink data channel resource.

Example 8: The method of any one of Examples 1 to 4, further comprising receiving higher-layer signaling from a base station, the higher-layer signaling assigning the random access preamble and the particular uplink data channel resource.

Example 9: The method of any one of Examples 1 to 8, wherein the particular uplink data channel resource is also associated with a time-frequency location in the random access channel at which the random access preamble is transmitted.

Example 10: The method of any one of Examples 1 to 9, wherein the particular uplink data channel resource comprises a particular time-frequency location in the uplink data channel.

Example 11: The method of any one of Examples 1 to 10, wherein the data transmitted on the uplink data channel comprises a RRC connection message.

Example 12: The method of any one of Examples 1 to 11, wherein the transmitting the data on the uplink data channel is performed without waiting for a response message from the base station in response to transmitting the random access preamble.

Example 13: The method of Example 12, further comprising after transmitting both the random access preamble and the data on the uplink data channel: receiving at least one message from the base station, the at least one message including: an identity of the random access preamble, a TA value, and a response to the data that was transmitted on the uplink data channel.

Example 14: The method of Example 12, further comprising after transmitting both the random access preamble and the data on the uplink data channel: receiving a message from the base station granting a retransmission of the data on the uplink channel; and retransmitting the data on the uplink channel using a resource that was granted by the base station.

Example 15: The method of Example 12, further comprising after transmitting both the random access preamble and the data on the uplink data channel: in the absence of a response from the base station within a predetermined duration of time, retransmitting the random access preamble on the random access channel.

Example 16: The method of Example 15, further comprising retransmitting both the random access preamble and the uplink data transmission prior to expiry of the predetermined duration of time.

Example 17: The method of any one of Examples 1 to 16, wherein the random access preamble is selected by the UE from a particular set of random access preambles, and wherein the particular set of random access preambles are used for two-step random access procedures and not used for four-step random access procedures.

Example 18: The method of any one of Examples 1 to 17, wherein the random access preamble is transmitted on a particular time-frequency resource on the random access channel, and wherein the particular time-frequency resource is used for two-step random access procedures and not used for four-step random access procedures.

Example 19: A UE configured to perform the method of any one of Examples 1 to 18.

Example 20: A UE comprising: a memory having processor-executable instructions stored thereon; a processor configured to execute the processor-executable instructions in order to cause the UE to perform the method of any one of Examples 1 to 18.

Example 21: A user equipment comprising: a transmitter, and a random access module; the random access module causing the transmitter to: transmit a random access preamble on a random access channel, and transmit data on an uplink data channel using a particular uplink data channel resource; wherein the particular uplink data channel resource is associated with the random access preamble.

Example 22: A method performed by a base station comprising: receiving a random access preamble on a random access channel; and decoding data received on an uplink data channel, the data received at a particular uplink data channel resource; wherein the particular uplink data channel resource is associated with the random access preamble.

Example 23: The method of Example 22, wherein the particular uplink data channel resource comprises a particular time-frequency location in the uplink data channel.

Example 24: The method of Example 22 or Example 23, wherein the particular uplink data channel resource is determined by the base station based on an identity of the random access preamble.

Example 25: The method of any one of Examples 22 to 24, wherein there is a one-to-one mapping between the particular uplink data channel resource and the random access preamble.

Example 26: The method of any one of Examples 22 to 25, further comprising: prior to receiving the random access preamble, transmitting at least one message indicating the association between the random access preamble and the particular uplink data channel resource.

Example 27: The method of Example 26, wherein the at least one message is transmitted in a broadcast channel and/or in higher-layer signaling.

Example 28: The method of Example 26 or Example 27, wherein the random access preamble is a particular random access preamble, and wherein the at least one message transmitted indicates: a set of random access preambles including the particular random access preamble, wherein each random access preamble in the set of random access preambles is associated with a respective uplink data channel resource; and an indication of the association between: (i) each random access preamble in the set of random access preambles and (ii) the respective uplink data channel resource.

Example 29: The method of Example 28, wherein each random access preamble in the set of random access preambles is associated with a different uplink data channel resource.

Example 30: The method of any one of Examples 22 to 29, wherein the particular uplink data channel resource is also associated with a time-frequency location in the random access channel at which the random access preamble is received.

Example 31: The method of any one of Examples 22 to 30, further comprising transmitting at least one message including: an identity of the random access preamble received on the random access channel, a TA value, and a response to the data that was received on the uplink data channel.

Example 32: The method of any one of Examples 22 to 30, wherein in response to decoding of the data being unsuccessful, the method further comprising transmitting at least one message granting a retransmission of the data on the uplink channel.

Example 33: The method of Example 32, wherein the at least one message granting the retransmission also includes an identity of the random access preamble received on the random access channel and a TA value.

Example 34: The method of Example 33, further comprising receiving the retransmission of the data on the uplink channel, the retransmission using the TA value.

Example 35: The method of any one of Examples 22 to 34, wherein the random access preamble is from a particular set of random access preambles, and wherein the particular set of random access preambles are used for two-step random access procedures and not used for four-step random access procedures.

Example 36: The method of any one of Examples 22 to 35, wherein the random access preamble is received on a particular time-frequency resource on the random access channel, and wherein the particular time-frequency resource is used for two-step random access procedures and not used for four-step random access procedures.

Example 37: A base station configured to perform the method of any one of Examples 22 to 36.

Example 38: A base station comprising: a memory having processor-executable instructions stored thereon; a processor configured to execute the processor-executable instructions in order to cause the base station to perform the method of any one of Examples 22 to 36.

Example 39: A base station comprising: a receiver; and a decoder; the receiver to receive a random access preamble on a random access channel, and to receive data on an uplink data channel at a particular uplink data channel resource, wherein the particular uplink data channel resource is associated with the random access preamble; the decoder to decode the data.

Example 40: A method performed by a UE, the method comprising: transmitting a random access preamble on a random access channel; and transmitting data on an uplink data channel using a particular uplink data channel resource; wherein the particular uplink data channel resource is selected by the UE based on the random access preamble.

Example 41: The method of Example 40, wherein there is a one-to-one mapping between the particular uplink data channel resource and the random access preamble.

Example 42: The method of Example 40, wherein the particular uplink data channel resource is associated with both the random access preamble and at least one other random access preamble.

Example 43: The method of Example 40, wherein at least one other uplink data channel resource different from the particular uplink data channel resource is also associated with the random access preamble.

Example 44: The method of Example 40, wherein the random access preamble is selected from a set of random access preambles, and wherein each random access preamble in the set of random access preambles is associated with a respective uplink data channel resource.

Example 45: The method of Example 44, wherein each random access preamble in the set of random access preambles is associated with a different uplink data channel resource.

Example 46: The method of Example 44, wherein more than one random access preamble in the set of random access preambles is associated with a same uplink data channel resource.

Example 47: The method of any one of Examples 44 to 46, further comprising receiving, from a base station: an indication of the set of random access preambles; and an indication of an association between: (i) each random access preamble in the set of random access preambles and (ii) the respective uplink data channel resource.

Example 48: The method of Example 47, comprising receiving, from the base station, at least one transmission parameter for the respective uplink data channel resource; and wherein the at least one transmission parameter includes at least one of the following: time-frequency resource allocation in the uplink data channel; resource index; frequency hopping flag; modulation and coding scheme (MCS) to be used for an uplink data transmission; transmission power control (TPC) for the uplink data transmission; channel state information (CSI); demodulation reference signal (DMRS); transmit power ramping value; periodicity; a hopping parameter; bandwidth part; numerology; repetition pattern.

Example 49: The method of any one of Examples 40 to 48, wherein the random access preamble is selected by the UE from a particular set of random access preambles, and wherein the particular set of random access preambles are used for two-step random access procedures and not used for four-step random access procedures.

Example 50: The method of Example 49, wherein both the particular set of random access preambles used for the two-step random access procedures and other random access preambles used for the four-step random access procedures use a same random access channel.

Example 51: The method of any one of Examples 40 to 48, wherein the random access preamble is transmitted on a particular time-frequency resource on the random access channel, and wherein the particular time-frequency resource is used for two-step random access procedures and not used for four-step random access procedures.

Example 52: The method of Example 51, wherein the random access preamble is selected by the UE from a particular set of random access preambles, and wherein the particular set of random access preambles is used for both two-step random access procedures and four-step random access procedures.

Example 53: A user equipment comprising: a transmitter; and a random access module; the random access module to cause the transmitter to: transmit a random access preamble on a random access channel, and transmit data on an uplink data channel using a particular uplink data channel resource; wherein the random access module is to select the particular uplink data channel resource based on the random access preamble.

Example 54: The UE of Example 53, wherein there is a one-to-one mapping between the particular uplink data channel resource and the random access preamble.

Example 55: The UE of Example 53, wherein the particular uplink data channel resource is associated with both the random access preamble and at least one other random access preamble.

Example 56: The UE of Example 53, wherein at least one other uplink data channel resource different from the particular uplink data channel resource is also associated with the random access preamble.

Example 57: The UE of Example 53, wherein the random access module is to select the random access preamble from a set of random access preambles, and wherein each random access preamble in the set of random access preambles is associated with a respective uplink data channel resource.

Example 58: The UE of Example 57, wherein each random access preamble in the set of random access preambles is associated with a different uplink data channel resource.

Example 59: The UE of Example 57, wherein more than one random access preamble in the set of random access preambles is associated with a same uplink data channel resource.

Example 60: The UE of any one of Examples 57 to 59, further comprising a receiver to receive, from a base station: an indication of the set of random access preambles; and an indication of an association between (i) each random access preamble in the set of random access preambles and (ii) the respective uplink data channel resource.

Example 61: The UE of Example 60, wherein the receiver is to receive, from the base station, at least one transmission parameter for the respective uplink data channel resource; and wherein the at least one transmission parameter includes at least one of the following: time-frequency resource allocation in the uplink data channel; resource index; frequency hopping flag; modulation and coding scheme (MCS) to be used for an uplink data transmission; transmission power control (TPC) for the uplink data transmission; channel state information (CSI); demodulation reference signal (DMRS); transmit power ramping value; periodicity; a hopping parameter; bandwidth part; numerology; repetition pattern.

Example 62: The UE of any one of Examples 53 to 61, wherein the random access module is to select the random access preamble from a particular set of random access preambles, and wherein the particular set of random access preambles are used for two-step random access procedures and not used for four-step random access procedures.

Example 63: The UE of Example 62, wherein both the particular set of random access preambles used for the two-step random access procedures and other random access preambles used for the four-step random access procedures use a same random access channel.

Example 64: The UE of any one of Examples 53 to 61, wherein the transmitter is to transmit the random access preamble on a particular time-frequency resource on the random access channel, and wherein the particular time-frequency resource is used for two-step random access procedures and not used for four-step random access procedures.

Example 65: The UE of Example 64, wherein the random access module is to select the random access preamble from a particular set of random access preambles, and wherein the particular set of random access preambles is used for both two-step random access procedures and four-step random access procedures.

CONCLUSION

In some embodiments above, a two-step random access procedure is disclosed that may reduce the cycle of the random access procedure and may enhance channel resource efficiency. In some embodiments, the two-step random access procedure is based on combining UE messages Msg 1 and Msg 3 of the four-step random access procedure, and by combining base station messages Msg 2 and Msg 4 of the four-step random access procedure. Using the two-step random access procedure, one, some, or all of the following scenarios may be better supported: enhanced network access; enhanced data transmissions for fast network entry, connection set-ups; fast state transitions; more effective data transmissions upon uplink out-of-synchronization.

In some embodiments above, designs are presented including for: the configuration of the two-step random access resources; details on uplink data channel resource configuration for transmitting Msg 3 in the two-step random access; details on association between random access preambles and one or more uplink data channel resources; details to support fallback to four-step random access upon failure of two-step random access.

Although the present invention has been described with reference to specific features and embodiments thereof, various modifications and combinations can be made thereto without departing from the invention. The description and drawings are, accordingly, to be regarded simply as an illustration of some embodiments of the invention as defined by the appended claims, and are contemplated to cover any and all modifications, variations, combinations or equivalents that fall within the scope of the present invention. Therefore, although the present invention and its advantages have been described in detail, various changes, substitutions and alterations can be made herein without departing from the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

Moreover, any module, component, or device exemplified herein that executes instructions may include or otherwise have access to a non-transitory computer/processor readable storage medium or media for storage of information, such as computer/processor readable instructions, data structures, program modules, and/or other data. A non-exhaustive list of examples of non-transitory computer/processor readable storage media includes magnetic cassettes, magnetic tape, magnetic disk storage or other magnetic storage devices, optical disks such as compact disc read-only memory (CD-ROM), digital video discs or digital versatile disc (DVDs), Blu-ray Disc™, or other optical storage, volatile and non-volatile, removable and non-removable media implemented in any method or technology, random access memory (RAM), read-only memory (ROM), electrically erasable programmable read-only memory (EEPROM), flash memory or other memory technology. Any such non-transitory computer/processor storage media may be part of a device or accessible or connectable thereto. Any application or module herein described may be implemented using computer/processor readable/executable instructions that may be stored or otherwise held by such non-transitory computer/processor readable storage media.

What is claimed is:

1. A method, comprising:
    transmitting, by an apparatus, a random access preamble on a random access channel in a message; and
    transmitting, by the apparatus, data on an uplink data channel using an uplink data channel resource in the message, wherein the uplink data channel resource is configured with a modulation and coding scheme (MCS) for transmission of the data,
    wherein the uplink data channel resource is associated with a demodulation reference signal (DMRS), and
    wherein the random access preamble transmitted in the random access channel is mapped to the uplink data channel resource and the DMRS, wherein there is a mapping between the random access channel and the uplink data channel resource, wherein the mapping is based on a relative time location of the uplink data channel resource to the random access channel in which the random access preamble is transmitted, wherein the relative time location is indicated by broadcast signaling or radio resource control (RRC) signaling, and wherein an index of the random access preamble is used for the mapping from the random access preamble to the uplink data channel resource.

2. The method of claim 1, wherein there is a one-to-one mapping between the uplink data channel resource and the random access preamble.

3. The method of claim 1, wherein the uplink data channel resource is associated with both the random access preamble and at least one other random access preamble.

4. The method of claim 1, further comprising:
receiving, by the apparatus, system information or the RRC signaling that comprises a configuration of one or more of:
one or more random access channels, wherein the one or more random access channels comprise the random access channel;
a set of random access preambles; or
one or more uplink data channel resources, wherein the one or more uplink data channel resources comprise the uplink data channel resource, and wherein the DMRS is configured within the uplink data channel resource.

5. The method of claim 4, wherein the set of random access preambles are sequentially indexed in an ascending order, wherein the one or more uplink data channel resources are indexed over time frequency resource locations of the one or more uplink data channel resources or DMRS configurations associated with the one or more uplink data channel resources, and wherein each random access preamble in the set of random access preambles is associated with a respective uplink data channel resource in the one or more uplink data channel resources.

6. The method of claim 5, wherein each random access preamble in the set of random access preambles is associated with a different uplink data channel resource in the one or more uplink data channel resources.

7. The method of claim 5, wherein more than one random access preamble in the set of random access preambles is associated with a same uplink data channel resource in the one or more uplink data channel resources.

8. The method of claim 5, further comprising:
receiving, from a base station:
an indication of the set of random access preambles, and
an indication of an association between: (i) each random access preamble in the set of random access preambles and (ii) the respective uplink data channel resource in the one or more uplink data channel resources.

9. The method of claim 1,
wherein the uplink data channel resource is configured with at least one transmission parameter, and
wherein the at least one transmission parameter includes at least one of: time-frequency resource allocation in the uplink data channel, a resource index, a frequency hopping flag, transmission power control (TPC), channel state information (CSI), a transmit power ramping value, periodicity, a hopping parameter, a bandwidth part, a numerology, or a repetition pattern.

10. The method of claim 1, wherein the random access preamble is selected by the apparatus from a particular set of random access preambles, and wherein the particular set of random access preambles are used for two-step random access procedures and not used for four-step random access procedures.

11. The method of claim 10, wherein both the particular set of random access preambles used for the two-step random access procedures and other random access preambles used for the four-step random access procedures use a same random access channel.

12. The method of claim 1, wherein the random access preamble is transmitted on a particular time-frequency resource on the random access channel, and wherein the particular time-frequency resource is used for two-step random access procedures and not used for four-step random access procedures.

13. The method of claim 12, wherein the random access preamble is selected by the apparatus from a particular set of random access preambles, and wherein the particular set of random access preambles is used for both the two-step random access procedures and the four-step random access procedures.

14. An apparatus, comprising:
at least one processor; and
a non-transitory computer readable storage medium storing programming for execution by the at least one processor, the programming including instructions to cause the apparatus to:
transmit a random access preamble on a random access channel in a message; and
transmit data on an uplink data channel using an uplink data channel resource in the message, wherein the uplink data channel resource is configured with a modulation and coding scheme (MCS) for transmission of the data,
wherein the uplink data channel resource is associated with a demodulation reference signal (DMRS), and wherein the random access preamble transmitted in the random access channel is mapped to the uplink data channel resource and the DMRS,
wherein there is a mapping between the random access channel and the uplink data channel resource, wherein the mapping is based on a relative time location of the uplink data channel resource to the random access channel in which the random access preamble is transmitted, wherein the relative time location is indicated by broadcast signaling or radio resource control (RRC) signaling, and
wherein an index of the random access preamble is used for the mapping from the random access preamble to the uplink data channel resource.

15. The apparatus of claim 14, wherein there is a one-to-one mapping between the uplink data channel resource and the random access preamble.

16. The apparatus of claim 14, wherein the uplink data channel resource is associated with both the random access preamble and at least one other random access preamble.

17. The apparatus of claim 14, the programming further including instructions to cause the apparatus to:
receive system information or the RRC signaling that comprises a configuration of one or more of:
one or more random access channels, wherein the one or more random access channels comprise the random access channel;
a set of random access preambles, wherein the random access preamble is one of the set of random access preambles on the random access channel, and wherein random access preambles in the set of random access preambles are consecutively indexed; or one or more uplink data channel resources, wherein the one or more uplink data channel resources comprise the uplink data channel resource, and wherein the DMRS is configured within the uplink data channel resource.

18. The apparatus of claim 17, wherein the set of random access preambles are sequentially indexed in an ascending order, wherein the one or more uplink data channel resources are indexed over time frequency resource locations of the one or more uplink data channel resources or DMRS configurations associated with the one or more uplink data channel resources, and wherein each random access preamble in the set of random access preambles is associated with a respective uplink data channel resource in the one or more uplink data channel resources.

19. The apparatus of claim 18, wherein each random access preamble in the set of random access preambles is associated with a different uplink data channel resource in the one or more uplink data channel resources.

20. The apparatus of claim 18, wherein more than one random access preamble in the set of random access preambles is associated with a same uplink data channel resource in the one or more uplink data channel resources.

21. The apparatus of claim 18, the programming further including instructions to cause the apparatus to:
receive, from a base station:
an indication of the set of random access preambles, and
an indication of an association between (i) each random access preamble in the set of random access preambles and (ii) the respective uplink data channel resource in the one or more uplink data channel resources.

22. The apparatus of claim 14,
wherein the uplink data channel resource is configured with at least one transmission parameter, and
wherein the at least one transmission parameter includes at least one of: time-frequency resource allocation in the uplink data channel, a resource index, a frequency hopping flag, transmission power control (TPC), channel state information (CSI), a transmit power ramping value, periodicity, a hopping parameter, a bandwidth part, a numerology, or a repetition pattern.

23. The apparatus of claim 14, wherein the random access preamble is selected by the apparatus from a particular set of random access preambles, and wherein the particular set of random access preambles are used for two-step random access procedures and not used for four-step random access procedures.

24. The apparatus of claim 23, wherein both the particular set of random access preambles used for the two-step random access procedures and other random access preambles used for the four-step random access procedures use a same random access channel.

25. The apparatus of claim 14, the programming further including instructions to cause the apparatus to:
transmit the random access preamble on a particular time-frequency resource on the random access channel, and wherein the particular time-frequency resource is used for two-step random access procedures and not used for four-step random access procedures.

26. The apparatus of claim 25, wherein the random access preamble is selected by the apparatus from a particular set of random access preambles, and wherein the particular set of random access preambles is used for both the two-step random access procedures and the four-step random access procedures.

27. The apparatus of claim 14,
wherein an index of the uplink data channel resource is associated with a time-frequency location on the uplink data channel and the DMRS, and,
wherein the index of the random access preamble is associated with a time-frequency location on the random access channel.

28. The method of claim 1,
wherein the random access preamble is one of a set of random access preambles on the random access channel, and
wherein random access preambles in the set of random access preambles are consecutively indexed.

* * * * *